US012707280B2

(12) United States Patent
He et al.

(10) Patent No.: US 12,707,280 B2
(45) Date of Patent: Aug. 11, 2026

(54) INFORMATION TRANSMISSION METHOD AND COMMUNICATION APPARATUS

(71) Applicant: Huawei Technologies Co., Ltd., Shenzhen (CN)

(72) Inventors: Hongli He, Beijing (CN); Xueru Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 252 days.

(21) Appl. No.: 18/541,397

(22) Filed: Dec. 15, 2023

(65) Prior Publication Data

US 2024/0121627 A1 Apr. 11, 2024

Related U.S. Application Data

(63) Continuation of application No. PCT/CN2022/091538, filed on May 7, 2022.

(30) Foreign Application Priority Data

Jun. 17, 2021 (CN) ......................... 202110670128.9
Sep. 14, 2021 (CN) ......................... 202111076369.7

(51) Int. Cl.
*H04W 16/28* (2009.01)
*H04W 24/08* (2009.01)
(Continued)

(52) U.S. Cl.
CPC ........... *H04W 16/28* (2013.01); *H04W 24/08* (2013.01); *H04W 72/0453* (2013.01); *H04W 74/0816* (2013.01); *H04W 76/20* (2018.02)

(58) Field of Classification Search
CPC . H04W 16/28; H04W 24/08; H04W 72/0453; H04W 74/0816; H04W 76/20;
(Continued)

(56) References Cited

U.S. PATENT DOCUMENTS 11,601,824 B2 * 3/2023 Hamidi-Sepehr ............................ H04B 7/06956
2021/0014026 A1 * 1/2021 Papasakellariou .... H04L 1/1861
(Continued)

FOREIGN PATENT DOCUMENTS

CN 111148125 A 5/2020
CN 111277381 A 6/2020
EP 3609109 A1 2/2020

OTHER PUBLICATIONS

3GPP TS 38.213 V16.5.0 (Mar. 2021), "3rd Generation Partnership Project; Technical Specification Group Radio Access Network; NR; Physical layer procedures for control (Release 16)", total 183 pages.
(Continued)

*Primary Examiner* — Liem H. Nguyen
(74) *Attorney, Agent, or Firm* — Slater Matsil, LLP

(57) ABSTRACT

A method includes: obtaining first configuration information, where the first configuration information is used to configure a plurality of monitoring positions and receive spatial filtering parameter indication information associated with each of the plurality of monitoring positions, the plurality of monitoring positions are used to perform detection on control information, and at least two of the plurality of monitoring positions are associated with different pieces of receive spatial filtering parameter indication information; and performing detection on the control information through a first monitoring position, and determining, based on a detection result, whether to perform detection on the control information through a second monitoring position.

20 Claims, 7 Drawing Sheets

(51) Int. Cl.

| | |
|---|---|
| ***H04W 72/0453*** | (2023.01) |
| ***H04W 74/0816*** | (2024.01) |
| ***H04W 76/20*** | (2018.01) |

(58) Field of Classification Search

CPC .. H04W 24/02; H04W 74/0808; H04B 7/088; H04B 7/0695; H04L 5/0051; H04L 5/0053; H04L 5/0094; H04L 5/0023

See application file for complete search history.

(56) References Cited

U.S. PATENT DOCUMENTS

| | | | | |
|---|---|---|---|---|
| 2021/0105750 | A1* | 4/2021 | Khoshnevisan | H04W 72/23 |
| 2021/0120577 | A1* | 4/2021 | Jiang | H04W 72/23 |
| 2021/0168738 | A1* | 6/2021 | Shih | H04W 68/02 |
| 2021/0410145 | A1* | 12/2021 | Khoshnevisan | H04W 72/1263 |
| 2022/0046541 | A1* | 2/2022 | Wu | H04W 72/542 |
| 2022/0225133 | A1* | 7/2022 | Khoshnevisan | H04W 72/23 |
| 2023/0031559 | A1* | 2/2023 | Liu | H04W 24/08 |
| 2023/0217460 | A1* | 7/2023 | Zhang | H04W 72/0446 370/329 |
| 2024/0397523 | A1* | 11/2024 | Park | H04B 7/06966 |

OTHER PUBLICATIONS

3GPP TS 38.331 V16.4.1 (Mar. 2021), "3rd Generation Partnership Project; Technical Specification Group Radio Access Network; NR; Radio Resource Control (RRC) protocol specification (Release 16)", total 949 pages.

3GPP TS 38.321 V16.4.0 (Mar. 2021), "3rd Generation Partnership Project; Technical Specification Group Radio Access Network; NR; Medium Access Control (MAC) protocol specification (Release 16)", total 155 pages.

* cited by examiner

INFORMATION TRANSMISSION METHOD AND COMMUNICATION APPARATUS

CROSS-REFERENCE TO RELATED APPLICATIONS

This application is a continuation of International Application No. PCT/CN2022/091538, filed on May 7, 2022, which claims priority to Chinese Patent Application No. 202110670128.9, filed on Jun. 17, 2021 and Chinese Patent Application No. 202111076369.7, filed on Sep. 14, 2021. All of the aforementioned patent applications are hereby incorporated by reference in their entireties.

TECHNICAL FIELD

Embodiments of this application relate to the field of communication technologies, and in particular, to an information transmission method and a communication apparatus.

BACKGROUND

In an unlicensed frequency band, to avoid transmission interference between devices, a device may determine, according to a listen-before-talk (LBT) mechanism before channel access, whether the device can occupy a channel. For example, the device may first determine whether there is another device on the channel. If no other device is using the channel, the device may occupy and use the channel to transmit control information or data. If another device is occupying the channel, the device needs to wait until the another device finishes transmitting data, and then the device can occupy the channel. This process causes a long delay, and affects transmission performance.

In a wireless communication system such as a new radio (NR) system, downlink control information (DCI) is generally used to schedule data receiving and sending of a terminal device. For an unlicensed millimeter-wave band, to reduce a delay of sending control information caused by LBT, an access network device usually configures, for the terminal device, a plurality of search spaces (SS) for transmitting same DCI, so that the terminal device can blindly detect the DCI in the plurality of SSs.

The access network device sequentially or simultaneously performs LBT in beam directions corresponding to the plurality of SSs. When determining that a channel in one of the beam directions is available, the access network device sends DCI by using an SS corresponding to the beam, and does not additionally send the same DCI on another SS. The terminal consistently performs blind detection in the plurality of SSs. Such a design causes unnecessary energy consumption overheads of blind detection.

SUMMARY

Embodiments of this application provide an information transmission method and a communication apparatus, to reduce energy consumption overheads of blind detection.

According to a first aspect, an embodiment of this application provides an information transmission method. The method includes:

obtaining first configuration information, where the first configuration information is used to configure a plurality of monitoring positions and receive spatial filtering parameter indication information associated with each of the plurality of monitoring positions, the plurality of monitoring positions are used to perform detection on control information, and at least two of the plurality of monitoring positions are associated with different pieces of receive spatial filtering parameter indication information; and performing detection on the control information through a first monitoring position, and determining, based on a detection result, whether to perform detection on the control information through a second monitoring position, where the plurality of monitoring positions include the first monitoring position, and the second monitoring position is any monitoring position other than the first monitoring position in the plurality of monitoring positions.

In the foregoing design, the plurality of monitoring positions are configured to correspond to at least two receive beam directions, and whether to perform detection at another monitoring position is determined based on a detection result of the control information at a monitoring position, so that energy consumption overheads of blind detection of the control information in the at least two receive beam directions can be reduced.

In a possible design, a start time of the second monitoring position is not earlier than the first monitoring position. With such design, it can be determined as early as possible whether to perform detection at another monitoring position.

In a possible design, if the control information is detected through the first monitoring position, detection of the control information through the second monitoring position is skipped; or if the control information is not detected through the first monitoring position, detection is performed on the control information through the second monitoring position.

In a possible design, the performing detection on the control information through a first monitoring position includes: performing detection on first indication information in the control information through the first monitoring position, where the first indication information indicates to perform detection on the control information through the second monitoring position or not to perform detection on the control information through the second monitoring position. Based on this, if the first indication information in the control information is detected through the first monitoring position, it is determined, based on the first indication information, whether to perform detection on the control information through the second monitoring position; or if the first indication information in the control information is not detected through the first monitoring position, detection is performed on the control information through the second monitoring position.

In a possible design, the first monitoring position is any one of the plurality of monitoring positions.

According to a second aspect, an embodiment of this application provides an information transmission method. The method includes:

determining first configuration information, where the first configuration information is used to configure a plurality of monitoring positions and receive spatial filtering parameter indication information associated with each of the plurality of monitoring positions, the plurality of monitoring positions are used to perform detection on control information, and at least two of the plurality of monitoring positions are associated with different pieces of receive spatial filtering parameter indication information; and sending the first configuration information.

In the foregoing design, the plurality of monitoring positions are configured to correspond to at least two beam directions, so that LBT is performed in different beam directions, a success rate of information sending is increased, and an information sending delay is reduced.

In a possible design, the method further includes: sending control information through a first monitoring position, where the control information indicates not to perform detection on the control information through a second monitoring position, the plurality of monitoring positions include the first monitoring position, and the second monitoring position is any monitoring position other than the first monitoring position in the plurality of monitoring positions. With such design, control information at a monitoring position can be used to indicate not to perform detection at another monitoring position. This can reduce unnecessary energy consumption overheads of blind detection.

In a possible design, the method further includes: sending control information through a first monitoring position, where the control information includes first indication information, the first indication information indicates to perform detection on the control information through a second monitoring position or not to perform detection on the control information through a second monitoring position, the plurality of monitoring positions include the first monitoring position, and the second monitoring position is any monitoring position other than the first monitoring position in the plurality of monitoring positions. With such design, the first indication information in control information at a monitoring position can be used to indicate whether to perform detection at another monitoring position. This can reduce unnecessary energy consumption overheads of blind detection.

In a possible design, a start time of the second monitoring position is not earlier than the first monitoring position.

In a possible design, the first monitoring position is any one of the plurality of monitoring positions.

According to a third aspect, an embodiment of this application provides an information transmission method. The method includes:

- obtaining first configuration information, where the first configuration information is used to configure a plurality of monitoring positions and receive spatial filtering parameter indication information associated with each of the plurality of monitoring positions, the plurality of monitoring positions are used to perform detection on control information, and the plurality of monitoring positions are associated with same receive spatial filtering parameter indication information; and
- performing detection on first information through a first monitoring position, and determining, based on a detection result, whether to perform detection on the control information through a second monitoring position, where the plurality of monitoring positions include the first monitoring position, and the second monitoring position is any monitoring position other than the first monitoring position in the plurality of monitoring positions.

In the foregoing design, the plurality of monitoring positions are configured to correspond to a same receive beam direction, and whether to perform detection at another monitoring position is determined based on a detection result of the first information at the first monitoring position, so that unnecessary energy consumption overheads of blind detection in a same receive beam direction can be reduced.

In a possible design, if the first information is detected through the first monitoring position, detection is performed on the control information through the second monitoring position; or if the first information is not detected through the first monitoring position, detection of the control information through the second monitoring position is skipped.

In a possible design, the first monitoring position is a predetermined monitoring position in the plurality of monitoring positions. For example, the first monitoring position is a position earlier in time in the plurality of monitoring positions. With such design, it can be determined as early as possible whether to perform detection at another monitoring position.

In a possible design, the first configuration information includes information indicating the first monitoring position.

According to a fourth aspect, an embodiment of this application provides an information transmission method. The method includes:

- determining first configuration information, where the first configuration information is used to configure a plurality of monitoring positions and receive spatial filtering parameter indication information associated with each of the plurality of monitoring positions, the plurality of monitoring positions are used to perform detection on control information, and the plurality of monitoring positions are associated with same receive spatial filtering parameter indication information; and
- sending the first configuration information.

In the foregoing design, the plurality of monitoring positions are configured to correspond to a same receive beam direction, so that the control information in the same receive beam direction can be enhanced. This helps determine a blind detection policy for the same receive beam direction.

In a possible design, the method further includes: sending first information through a first monitoring position, where the first information indicates to perform detection on the control information through a second monitoring position, the plurality of monitoring positions include the first monitoring position, and the second monitoring position is any monitoring position other than the first monitoring position in the plurality of monitoring positions.

In a possible design, the first monitoring position is a predetermined monitoring position in the plurality of monitoring positions.

In a possible design, the first configuration information includes information indicating the first monitoring position.

According to a fifth aspect, an embodiment of this application provides a communication apparatus. The communication apparatus is configured to implement the method in the first aspect. The communication apparatus may be a second device (for example, a terminal device), or may be an apparatus in the second device, or may be an apparatus that can be matched with the second device for use. In a design, the communication apparatus may include modules that are in a one-to-one correspondence with the methods/operations/steps/actions described in the first aspect. The modules may be implemented by a hardware circuit, software, or a combination of a hardware circuit and software. In a design, the communication apparatus may include a processing module and a communication module. For example, the communication module is configured to obtain first configuration information, where the first configuration information is used to configure a plurality of monitoring positions and receive spatial filtering parameter indication information associated with each of the plurality of monitoring positions, the plurality of monitoring positions are used to perform detection on control information, and at least two of the plurality of monitoring positions are associated with different pieces of receive spatial filtering parameter indication information.

The processing module is configured to perform detection on the control information through a first monitoring position, and determine, based on a detection result, whether to perform detection on the control information through a second monitoring position, where the plurality of monitoring positions include the first monitoring position, and the second monitoring position is any monitoring position other than the first monitoring position in the plurality of monitoring positions.

In a possible design, a start time of the second monitoring position is not earlier than the first monitoring position.

In a possible design, the processing module is specifically configured to: if the control information is detected through the first monitoring position, skip performing detection on the control information through the second monitoring position; or if the control information is not detected through the first monitoring position, perform detection on the control information through the second monitoring position.

In a possible design, the processing module is specifically configured to perform detection on first indication information in the control information through the first monitoring position, where the first indication information indicates to perform detection on the control information through the second monitoring position or not to perform detection on the control information through the second monitoring position.

In a possible design, the first monitoring position is any one of the plurality of monitoring positions.

According to a sixth aspect, an embodiment of this application provides a communication apparatus. The communication apparatus is configured to implement the method in the second aspect. The communication apparatus may be a first device (for example, an access network device), may be an apparatus in the first device, or may be an apparatus that can be matched with the first device for use. In a design, the communication apparatus may include modules that are in a one-to-one correspondence with the methods/operations/steps/actions described in the second aspect. The modules may be implemented by a hardware circuit, software, or a combination of a hardware circuit and software. In a design, the communication apparatus may include a processing module and a communication module. For example, the processing module is configured to determine first configuration information, where the first configuration information is used to configure a plurality of monitoring positions and receive spatial filtering parameter indication information associated with each of the plurality of monitoring positions, the plurality of monitoring positions are used to perform detection on control information, and at least two of the plurality of monitoring positions are associated with different pieces of receive spatial filtering parameter indication information.

The communication module is configured to send the first configuration information.

In a possible design, the communication module is further configured to: send control information through a first monitoring position, where the control information indicates not to perform detection on the control information through a second monitoring position, the plurality of monitoring positions include the first monitoring position, and the second monitoring position is any monitoring position other than the first monitoring position in the plurality of monitoring positions.

In a possible design, the communication module is further configured to: send control information through a first monitoring position, where the control information includes first indication information, the first indication information indicates to perform detection on the control information through a second monitoring position or not to perform detection on the control information through a second monitoring position, the plurality of monitoring positions include the first monitoring position, and the second monitoring position is any monitoring position other than the first monitoring position in the plurality of monitoring positions.

In a possible design, a start time of the second monitoring position is not earlier than the first monitoring position.

In a possible design, the first monitoring position is any one of the plurality of monitoring positions.

According to a seventh aspect, an embodiment of this application provides a communication apparatus. The communication apparatus is configured to implement the method in the third aspect. The communication apparatus may be a second device (for example, a terminal device), or may be an apparatus in the second device, or may be an apparatus that can be matched with the second device for use. In a design, the communication apparatus may include modules that are in a one-to-one correspondence with the methods/operations/steps/actions described in the third aspect. The modules may be implemented by a hardware circuit, software, or a combination of a hardware circuit and software. In a design, the communication apparatus may include a processing module and a communication module. For example, the communication module is configured to obtain first configuration information, where the first configuration information is used to configure a plurality of monitoring positions and receive spatial filtering parameter indication information associated with each of the plurality of monitoring positions, the plurality of monitoring positions are used to perform detection on control information, and the plurality of monitoring positions are associated with same receive spatial filtering parameter indication information.

The processing module is configured to perform detection on first information through a first monitoring position, and determine, based on a detection result, whether to perform detection on the control information through a second monitoring position, where the plurality of monitoring positions include the first monitoring position, and the second monitoring position is any monitoring position other than the first monitoring position in the plurality of monitoring positions.

In a possible design, the processing module is specifically configured to: if the first information is detected through the first monitoring position, perform detection on the control information through the second monitoring position; or if the first information is not detected through the first monitoring position, skip performing detection on the control information through the second monitoring position.

In a possible design, the first monitoring position is a predetermined monitoring position in the plurality of monitoring positions.

In a possible design, the first configuration information includes information indicating the first monitoring position.

According to an eighth aspect, an embodiment of this application provides a communication apparatus. The communication apparatus is configured to implement the method in the fourth aspect. The communication apparatus may be a first device (for example, an access network device), may be an apparatus in the first device, or may be an apparatus that can be matched with the first device for use. In a design, the communication apparatus may include modules that are in a one-to-one correspondence with the methods/operations/steps/actions described in the fourth aspect. The modules may be implemented by a hardware circuit, software, or a combination of a hardware circuit and software. In a design, the communication apparatus may include a processing module and a communication module. For example, the processing module is configured to determine first configuration information, where the first configuration information is used to configure a plurality of monitoring positions and receive spatial filtering parameter indication information associated with each of the plurality of monitoring positions, the plurality of monitoring positions are used to perform detection on control information, and the plurality of monitoring positions are associated with same receive spatial filtering parameter indication information.

The communication module is configured to send the first configuration information.

In a possible design, the communication module is further configured to: send first information through a first monitoring position, where the first information indicates to perform detection on the control information through a second monitoring position, the plurality of monitoring positions include the first monitoring position, and the second monitoring position is any monitoring position other than the first monitoring position in the plurality of monitoring positions.

In a possible design, the first monitoring position is a predetermined monitoring position in the plurality of monitoring positions.

In a possible design, the first configuration information includes information indicating the first monitoring position.

The following describes possible designs of a plurality of aspects in the first aspect to the eighth aspect. In a possible design of any one of the first aspect to the eighth aspect, the plurality of monitoring positions are associated.

In a possible design of any one of the first aspect to the eighth aspect, the first configuration information includes second configuration information and third configuration information. The second configuration information is used to configure frequency domain positions of the plurality of monitoring positions. The third configuration information is used to configure time domain positions of the plurality of monitoring positions.

In a possible design of any one of the first aspect, the second aspect, the fifth aspect, and the sixth aspect, the second configuration information includes configuration information of a first control resource set CORESET. The configuration information of the first CORESET includes at least two transmission configuration indicators TCIs, and each of the TCIs indicates a receive spatial filtering parameter.

In a possible design of any one of the first aspect, the second aspect, the fifth aspect, and the sixth aspect, the third configuration information includes configuration information of a first search space SS, the first SS is associated with the first CORESET, the configuration information of the first SS includes information indicating a plurality of time offsets in a same periodicity, any one of the plurality of time offsets in the same periodicity is associated with one of the at least two TCIs, and any one of the plurality of monitoring positions is associated with one of the plurality of time offsets in the same periodicity.

In a possible design of any one of the first aspect, the second aspect, the fifth aspect, and the sixth aspect, the plurality of monitoring positions are in a one-to-one correspondence with the plurality of time offsets in the same periodicity, and monitoring positions corresponding to the plurality of time offsets in the same periodicity are associated.

In a possible design of any one of the first aspect, the second aspect, the fifth aspect, and the sixth aspect, the third configuration information includes configuration information of a plurality of second search space SSs, the plurality of second SSs are associated with the first CORESET, any one of the plurality of second SSs is associated with one of the at least two TCIs, and any one of the plurality of monitoring positions is associated with one of the plurality of second SSs.

In a possible design of any one of the first aspect, the second aspect, the fifth aspect, and the sixth aspect, the second configuration information includes configuration information of a plurality of second control resource sets CORESETs, configuration information of each second CORESET includes one transmission configuration indicator TCI, and the TCI is used to determine a receive spatial filtering parameter.

In a possible design of any one of the first aspect, the second aspect, the fifth aspect, and the sixth aspect, the third configuration information includes configuration information of a plurality of second search space SSs, any one of the plurality of second SSs is associated with one of the plurality of second CORESETs, and any one of the plurality of monitoring positions is associated with one of the plurality of second SSs.

In a possible design of any one of the first aspect, the second aspect, the fifth aspect, and the sixth aspect, configuration information of each second SS includes a time offset and periodicity information, the first configuration information further includes information indicating association between the plurality of second SSs, the plurality of second SSs include same periodicity information, and monitoring positions corresponding to the plurality of second SSs in a same periodicity are associated.

In a possible design of any one of the third aspect, the fourth aspect, the seventh aspect, and the eighth aspect, the first configuration information includes configuration information of a third search space SS, the configuration information of the third SS includes information indicating a plurality of time offsets in a same periodicity, the plurality of time offsets in the same periodicity are associated with a same transmission configuration indicator TCI, the TCI indicates a receive spatial filtering parameter, any one of the plurality of monitoring positions is associated with one of the plurality of time offsets in the same periodicity, and monitoring positions corresponding to the plurality of time offsets in the same periodicity are associated.

In a possible design of any one of the third aspect, the fourth aspect, the seventh aspect, and the eighth aspect, the first configuration information includes configuration information of a plurality of fourth search spaces SSs, configuration information of each fourth SS includes a time offset and periodicity information, the first configuration information further includes information indicating association between the plurality of fourth SSs, the plurality of fourth SSs are associated with a same transmission configuration indicator TCI, the TCI indicates a receive spatial filtering parameter, any one of the plurality of monitoring positions is associated with one of the plurality of fourth SSs, the plurality of fourth SSs include same periodicity information, and monitoring positions corresponding to the plurality of fourth SSs in a same periodicity are associated.

According to a ninth aspect, an embodiment of this application provides a communication apparatus. The communication apparatus includes a processor, configured to implement the method described in the first aspect or the third aspect. The communication apparatus may further include a memory, configured to store instructions and data. The memory is coupled to the processor. When executing the instructions stored in the memory, the processor can implement the method described in the first aspect or the third aspect. The communication apparatus may further include a communication interface. The communication interface is used by the apparatus to communicate with another device. For example, the communication interface may be a transceiver, a circuit, a bus, a module, or another type of communication interface, and the another device may be a first device (for example, an access network device).

In a possible device, corresponding to the method described in the first aspect, the communication apparatus includes:

a memory, configured to store program instructions; and a processor, configured to obtain first configuration information through a communication interface, where the first configuration information is used to configure a plurality of monitoring positions and receive spatial filtering parameter indication information associated with each of the plurality of monitoring positions, the plurality of monitoring positions are used to perform detection on control information, and at least two of the plurality of monitoring positions are associated with different pieces of receive spatial filtering parameter indication information.

The processor is further configured to perform detection on the control information through a first monitoring position, and determine, based on a detection result, whether to perform detection on the control information through a second monitoring position, where the plurality of monitoring positions include the first monitoring position, and the second monitoring position is any monitoring position other than the first monitoring position in the plurality of monitoring positions.

In another possible device, corresponding to the method described in the third aspect, the communication apparatus includes:

a memory, configured to store program instructions; and a processor, configured to obtain first configuration information through a communication interface, where the first configuration information is used to configure a plurality of monitoring positions and receive spatial filtering parameter indication information associated with each of the plurality of monitoring positions, the plurality of monitoring positions are used to perform detection on control information, and the plurality of monitoring positions are associated with same receive spatial filtering parameter indication information.

The processor is further configured to perform detection on first information through a first monitoring position, and determine, based on a detection result, whether to perform detection on the control information through a second monitoring position, where the plurality of monitoring positions include the first monitoring position, and the second monitoring position is any monitoring position other than the first monitoring position in the plurality of monitoring positions.

According to a tenth aspect, an embodiment of this application provides a communication apparatus. The communication apparatus includes a processor, configured to implement the method described in the second aspect or the fourth aspect. The communication apparatus may further include a memory, configured to store instructions and data. The memory is coupled to the processor, and when executing the instructions stored in the memory, the processor can implement the method described in the second aspect or the fourth aspect. The communication apparatus may further include a communication interface. The communication interface is used by the apparatus to communicate with another device. For example, the communication interface may be a transceiver, a circuit, a bus, a module, or another type of communication interface, and the another device may be a second device (for example, a terminal device).

In a possible device, corresponding to the method described in the second aspect, the communication apparatus includes:

a memory, configured to store program instructions; and a processor, configured to determine first configuration information, where the first configuration information is used to configure a plurality of monitoring positions and receive spatial filtering parameter indication information associated with each of the plurality of monitoring positions, the plurality of monitoring positions are used to perform detection on control information, and at least two of the plurality of monitoring positions are associated with different pieces of receive spatial filtering parameter indication information.

The processor is further configured to send the first configuration information through the communication interface.

In another possible device, corresponding to the method described in the fourth aspect, the communication apparatus includes:

a memory, configured to store program instructions; and a processor, configured to determine first configuration information, where the first configuration information is used to configure a plurality of monitoring positions and receive spatial filtering parameter indication information associated with each of the plurality of monitoring positions, the plurality of monitoring positions are used to perform detection on control information, and the plurality of monitoring positions are associated with same receive spatial filtering parameter indication information.

The processor is further configured to send the first configuration information through the communication interface.

According to an eleventh aspect, an embodiment of this application further provides a computer program. When the computer program is run on a computer, the computer is enabled to perform the method provided in any one of the first aspect to the fourth aspect.

According to a twelfth aspect, an embodiment of this application further provides a computer program product, including instructions. When the instructions are run on a computer, the computer is enabled to perform the method provided in any one of the first aspect to the fourth aspect.

According to a thirteenth aspect, an embodiment of this application further provides a computer-readable storage medium. The computer-readable storage medium stores a computer program or instructions. When the computer program or the instructions is/are executed on a computer, the computer is enabled to perform the method provided in any one of the first aspect to the fourth aspect.

According to a fourteenth aspect, an embodiment of this application further provides a chip. The chip is configured to read a computer program stored in a memory, to perform the method provided in any one of the first aspect to the fourth aspect.

According to a fifteenth aspect, an embodiment of this application further provides a chip system. The chip system includes a processor, configured to support a computer apparatus in implementing the method provided in any one of the first aspect to the fourth aspect. In a possible design, the chip system further includes a memory. The memory is configured to store a program and data that are necessary for the computer apparatus. The chip system may include a chip, or may include a chip and another discrete device.

BRIEF DESCRIPTION OF THE DRAWINGS

FIG. 8 is a schematic diagram of a configuration mode of monitoring positions according to an embodiment of this application;

FIG. 9 is a schematic flowchart of an information transmission method according to an embodiment of this application;

DETAILED DESCRIPTION OF ILLUSTRATIVE EMBODIMENTS

The following describes embodiments of this application in detail with reference to the accompanying drawings of this specification.

Embodiments of this application may be applied to various communication systems, including but not limited to a 4th generation (4G) communication technology system, a 5G system, a 5G sidelink (SL) system, a 5G evolved system, a 5G evolved SL system, and a future communication system. The 5G system includes a new radio (NR) system. The 4G system includes a global system for mobile communications (GSM), a long term evolution (LTE) system, and the like. This is not specifically limited herein. An entity in a communication system may send a signal (for example, control information or data) to or receive a signal from another entity.

Figure 1:
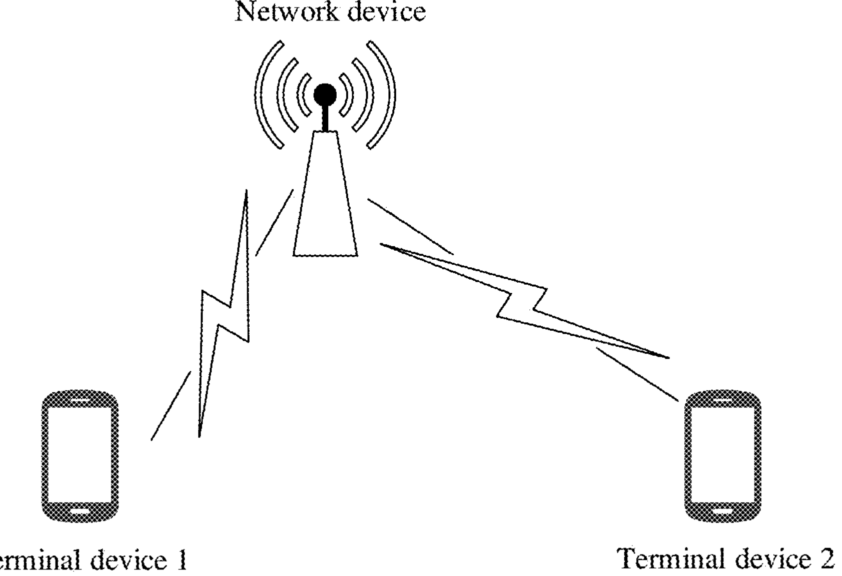
FIG. 1 is a schematic diagram of a structure of a communication system according to an embodiment of this application.

FIG. 1 shows a communication system. The communication system may include at least one terminal device and at least one access network device. A quantity of access network devices and a quantity of terminal devices included in the communication system are not limited in embodiments of this application. For example, FIG. 1 shows one access network device and two terminal devices, namely, a terminal device 1 and a terminal device 2. In the communication system, an entity that sends control information is the access network device, and an entity that receives control information is the terminal device. The access network device may send a downlink signal, for example, downlink control information DCI or downlink data, to the terminal device. The terminal device sends an uplink signal, for example, uplink data, to the access network device.

The access network device may be a base station (BS) or a transmission reception point (TRP). The access network device may also be referred to as a network device or an access node (AN). The access network device may provide a wireless access service for the terminal device. The access network device may be specifically an evolved NodeB (eNB or eNodeB) in the LTE system, or may be a next generation NodeB (gNB), a pico, a radio access node (Wi-Fi AP), or the like in the 5G network. This is not limited in embodiments of this application. In embodiments of this application, a communication apparatus configured to implement a function of the access network device may be an access network device, or may be a network device having some functions of the access network device, or may be an apparatus that can support the access network device in implementing the function, for example, a chip system. The apparatus may be installed in the access network device. In a method in embodiments of this application, an example in which the communication apparatus configured to implement a function of the access network device is an access network device is used for description.

The terminal device is also referred to as a terminal, user equipment (UE), a mobile station (MS), a mobile terminal (MT), or the like, and is a device that provides a user with voice and/or data connectivity. For example, the terminal device includes a handheld device, a vehicle-mounted device, or the like that has a wireless connection function. For example, some examples of the terminal are: customer premises equipment (CPE), a wireless network camera, a mobile phone, a tablet computer, a notebook computer, a palmtop computer, a mobile Internet device (MID), a wearable device such as a smartwatch, a virtual reality (VR) device, an augmented reality (AR) device, a wireless terminal in industrial control, a terminal in an Internet of Vehicles system, a wireless terminal in self driving, a wireless terminal in a smart grid, a wireless terminal in transportation safety, or a wireless terminal in a smart city. In embodiments of this application, a communication apparatus configured to implement a function of the terminal device may be a terminal device, or may be a terminal device having some functions of the terminal, or may be an apparatus that can support the terminal device in implementing the function, for example, a chip system. The apparatus may be installed in the terminal device. In the method in embodiments of this application, an example in which the communication apparatus configured to implement a function of the terminal device is a terminal device is used for description.

In addition, the terminal device 1 and the terminal device 2 in FIG. 1 may also form a communication system. In this case, both the entity that sends control information and the entity that receives control information may be terminal devices. For example, a plurality of terminal devices may send data to each other in the Internet of Vehicles system. The terminal device 1 sends configuration information to the terminal device 2, and receives data sent by the terminal device 2. The terminal device 2 receives the configuration information sent by the terminal device 1, and sends data to the terminal device 1.

Some terms in embodiments of this application are described below, to help a person skilled in the art have a better understanding.

(1) Control resource set (CORESET) and search space (SS)

The search space SS may also be a search space set (SSS). An access network device may configure a CORESET and a search space (which is collectively referred to as an SS below) for a terminal device, to transmit some related information, for example, downlink control information (DCI). For example, in an NR system, downlink control information (DCI) between an access network device and a terminal device is carried on a physical downlink control channel (PDCCH). The SS is associated with the CORESET, and a time-frequency position for blindly detecting the PDCCH may be determined. It may be understood that blind detection may be referred to as monitoring, detection, or the like, and blind detection of the PDCCH may be understood as blind detection of DCI, monitoring of DCI, detection of DCI, or the like. To be specific, the terminal device may determine some candidate periodic time-frequency resource positions based on the CORESET and SS that are configured by the access network device, and blindly detect the PDCCH at these positions, to determine whether the access network device delivers DCI and a specific position at which the access network device delivers the DCI, and whether to schedule data transmission of UE or determine reporting of channel state information, and the like.

Configuration information of the CORESET includes information such as a frequency domain position, a quantity of symbols, a resource mapping mode, and a transmission configuration indicator (TCI) of the CORESET. Configuration information of the SS includes a type of the SS (for example, a cell-level SS or a user (UE)-level SS), a periodicity (expressed in slots) of the SS, a time offset in the periodicity, a start monitoring symbol position in a monitoring slot (or referred to as a detection slot), a quantity of candidate physical downlinks at one or more aggregation levels, a supported DCI format, and other information.

Figure 2:
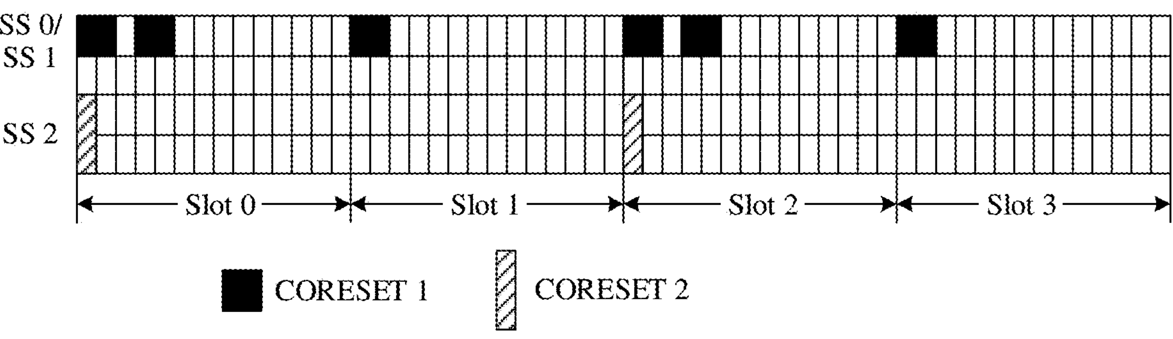
FIG. 2 is a schematic diagram of a configuration mode of a control resource set and a search space according to an embodiment of this application.

For example, FIG. 2 shows a configuration mode of a control resource set and a search space. The access network device configures two CORESETs for the terminal device, including a CORESET 1 and a CORESET 2. The CORESET 1 occupies two symbols in time domain, and occupies 12 physical resource blocks (PRB) in frequency domain. The CORESET 2 occupies one symbol in time domain, and occupies 24 PRBs in frequency domain. In addition, the access network device further configures three SSs for the terminal device, which are denoted as an SS 0, an SS 1, and an SS 2. The SS 0 and the SS 1 are associated with the CORESET 1. A periodicity of the SS 0 is one slot, and a start symbol is a symbol 0 in a first slot in the periodicity. A periodicity of the SS 1 is two slots, and a start symbol is a symbol 3 in a first slot in the periodicity. The SS 2 is associated with the CORESET 2. A periodicity of the SS 2 is two slots, and a start symbol is a symbol 0 in a first slot in the periodicity.

(2) Transmission configuration indicator (TCI)

The transmission configuration indicator may also be referred to as a sending configuration indicator, and is referred to as TCI for short. The TCI is used to indicate a quasi co-location (QCL) source reference signal (RS). The source RS may have a QCL relationship with a demodulation reference signal (DMRS) of a PDCCH on the CORESET, and indication of the TCI may be used for receiving of the PDCCH and channel estimation. Specifically, the TCI may be included in configuration information of the CORESET and configured for the terminal device.

In the NR system, QCL is defined as follows: If a channel characteristic represented by an antenna port on a symbol may be deduced from a channel represented by another antenna port on a symbol, it may be considered that the two channels have a QCL relationship. The QCL relationship may be configured by a higher layer. For example, the higher layer configures the QCL relationship through a transmission configuration indicator state (TCI state). One TCI state may include one downlink reference signal and a QCL type of the reference signal, or one TCI state may include indication information of a first downlink reference signal and a QCL type corresponding to the reference signal, and a second downlink reference signal and a QCL type corresponding to the reference signal. The QCL type corresponding to the second downlink reference signal is type-D. After a CORESET is configured or a TCI is activated, a receiving device may perform, based on a channel characteristic of a source RS indicated by the TCI, channel estimation when performing PDCCH blind detection on the CORESET.

QCL in embodiments of this application is a type D defined in NR: {Spatial Rx parameter}, and the typeD indicates that receive spatial filtering parameters used by two antenna ports are the same. If the source RS indicated by the TCI is a type-D QCLed RS, the TCI may be further used to assist a device that receives the TCI in determining a receive spatial filtering parameter used to perform PDCCH blind detection on the CORESET. The receive spatial filtering parameter may be understood as a receive beam, and receive spatial filtering parameter may be also referred to as a receiving spatial filtering parameter or a reception spatial filtering parameter. Specifically, the access network device configures a TCI for the terminal device, and the terminal device may determine a source RS indicated by the TCI. Because the terminal device may generally obtain, in previous beam training and beam measurement processes, a receive beam used to receive the source RS, the access network device configures, for the terminal device, a CORESET associated with the TCI. It may be understood that a transmit beam (or referred to as a transmit spatial filtering parameter, a transmitting spatial filtering parameter, or a transmission spatial filtering parameter) used by the access network device to send the TCI on the CORESET is the same as a transmit beam previously used to send the source RS corresponding to the TCI. Therefore, the terminal device can determine a receive beam used to perform PDCCH blind detection on the CORESET.

(3) Unlicensed frequency band

Using the NR system as an example, used frequency bands mainly include an FR1 frequency band and an FR2 frequency band. A frequency range of the FR1 frequency band is 450 MHz to 6 GHz, which is also referred to as sub-6 GHz frequency band. A frequency range of the FR2 frequency band is 24.25 GHz to 52.6 GHz. In addition, a range can be expanded to a higher frequency band, for example, 52.6 GHz to 71 GHz. FR2 and even a higher frequency band may also be referred to as millimeter wave (mmWave).

The millimeter-wave band has an advantage of large bandwidth. The millimeter-wave band can support transmission of a large data rate and a low latency, and can be applied to a plurality of service scenarios such as enhanced mobile broadband (eMBB), augmented/virtual reality, mobile data offloading, short-distance direct communication, and wireless backhaul link. Further, a large bandwidth can implement higher time resolution in positioning, thereby correspondingly improving positioning accuracy. However, compared with the sub-6 GHz frequency band, the millimeter-wave frequency band has quite large channel attenuation. Therefore, a signal sending device needs to use a specific spatial filtering parameter, with beamforming or another technology, to concentrate energy of a signal in a specific direction (which is also referred to as a beam direction below). Correspondingly, a signal receiving device also needs to select a corresponding receive beam direction, to improve an equivalent channel gain between the sending device and the receiving device, and ensure coverage performance and a data transmission rate of millimeter-wave communication. Therefore, beam training between the access network device and the terminal device needs to be performed in advance during deployment on the millimeter wave, to determine one or more proper transmit/receive beam pairs between the access network device and the terminal device. When the access network device and the terminal device need to communicate with each other, a transmit/receive beam pair to be used at a specific time-frequency resource position is agreed on through signaling interaction or a default rule. With reference to the type-D in the QCL relationship type described above, the access network device may additionally configure a QCL type-D source RS in the TCI of the CORESET. With such configuration mode, the following information may be indicated to the terminal device: If the access network device sends DCI (carried on a PDCCH) on the CORESET, the access network device uses a beam same as that for sending the source RS. The terminal device can correspondingly learn, based on a previous beam training result, a specific receive beam to be used to perform PDCCH blind detection on the CORESET.

Some frequency bands in 52.6 GHz to 71 GHz frequency bands may be unlicensed frequency bands, or referred to as unlicensed millimeter-wave frequency bands. On the unlicensed millimeter-wave band, a device needs to use a directional listen before talk LBT mechanism. To be specific, the device determines, in a specific receive beam direction, whether another device occupies a channel, and when determining that no other device uses the channel, sends control information or data by using a transmit beam corresponding to the receive beam direction. However, when another device is occupying the channel, the device needs to wait until the another device finishes transmitting data.

(4) "Plurality" in this disclosure means two or more. The term "and/or" describes an association relationship for describing associated objects and represents that three relationships may exist. For example, A and/or B may indicate the following three cases: Only A exists, both A and B exist, and only B exists. The character "/" generally indicates an "or" relationship between the associated objects. In addition, it should be understood that although terms defined with "first" and "second" may be used to describe objects in this disclosure, these objects should not be limited to these terms. These terms are merely used to distinguish between the objects.

(5) Terms "including", "having", and any other variant thereof mentioned in descriptions of this disclosure are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device. It should be noted that, in this disclosure, the word such as "example" or "for example" is used to represent giving an example, an illustration, or a description. Any method or design described as "example" or "for example" in this disclosure should not be explained as being more preferred or having more advantages than another method or design. To be precise, the word such as "example" or "for example" is intended to present a related concept in a specific manner.

In a communication system such as the NR system, downlink control information DCI is generally used for scheduling of data transmission of a terminal device, reporting of channel state information, and the like. Because a base station first needs to perform beamforming in an analog domain, there is a high probability that the base station can perform LBT only in one beam direction at a moment. After the LBT fails in the beam direction, the base station may lose a transmission opportunity. For the unlicensed millimeter-wave band, a control channel may be enhanced, to reduce a control information sending delay caused by the LBT mechanism.

In a possible solution, the access network device may reduce a control information sending delay and an overall transmission delay by increasing a sending opportunity of sending the control information. Specifically, the following steps S1 to S4 are included.

S1: The access network device and the terminal determine a plurality of beam pairs with good signal quality through a beam training procedure, and then the access network device configures a plurality of TCIs for the terminal device based on a beam training result, where a type-D QCL source RS in the plurality of TCIs may be associated with the beam pair with good signal quality.

S2: The access network device sends configuration information of a plurality of CORESETs to the terminal device, where each CORESET includes a TCI as described in step S1.

S3: The access network device sends configuration information of a plurality of SSs to the terminal device, where each SS corresponds to one CORESET in step S2, and the SSs are different in time, that is, the access network device configures blind detection of a PDCCH in different time and different beam directions for the terminal device.

S4: The access network device sequentially or simultaneously performs LBT in a plurality of beam directions. When determining that a channel in one of the beam directions is available, the access network device sends DCI (carried on a PDCCH) in an SS corresponding to the beam. Then, the terminal device can correspondingly perform blind detection on the PDCCH.

Figures 3, 4:
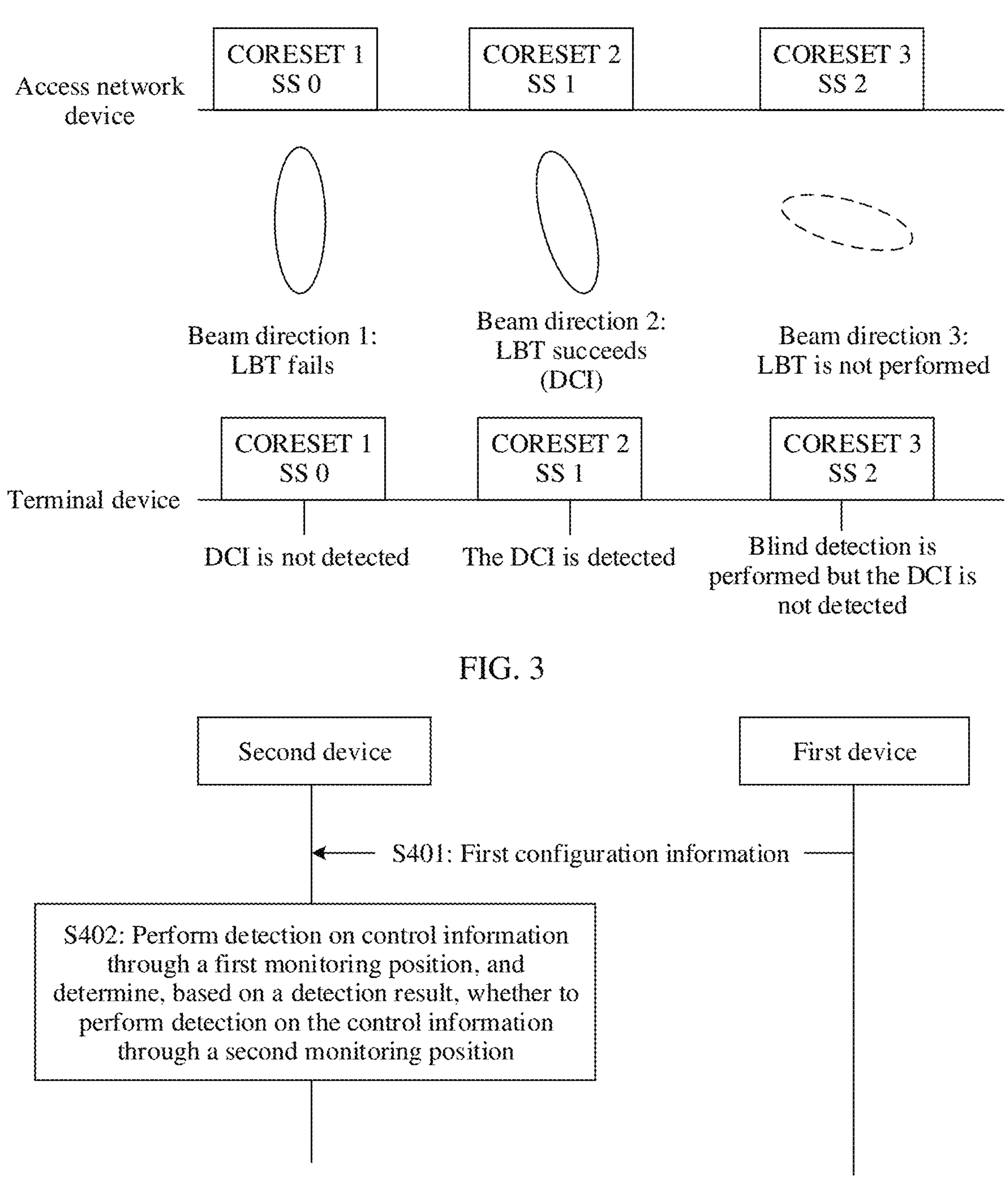
FIG. 3 is a schematic diagram of a procedure for performing detection on DCI in a related technology.
FIG. 4 is a schematic flowchart of an information transmission method according to an embodiment of this application.

As shown in FIG. 3, the access network device configures three CORESETs and three corresponding SSs for the terminal device, which are denoted as a CORESET 1 and an SS 0, a CORESET 2 and an SS 1, and a CORESET 3 and an SS 2. The terminal device may separately perform blind detection on the CORESET 1 and the SS 0, the CORESET 2 and the SS 1, and the CORESET 3 and the SS 2. Each CORESET corresponds to one beam direction (indicated by a TCI). When the access network device needs to send DCI to the terminal device, the access network device first performs LBT in a beam direction corresponding to the CORESET 1, but finds that a channel is occupied by another device, and then performs LBT on the CORESET 2, and sends the DCI to the terminal device after determining that the channel is idle. In this case, the access network device no longer performs LBT in a beam direction corresponding to the CORESET 3, and no longer sends the DCI on the CORESET 3. Based on this, the terminal device does not detect the DCI on the CORESET 1 and the SS 0, and the CORESET 3 and the SS 2, but can successfully detect the DCI on the CORESET 2 and the SS 1. However, regardless of whether blind detection of the DCI succeeds or not, the terminal device performs blind detection on the CORESET 1 and the SS 0, the CORESET 2 and the SS 1, and the CORESET 3 and the SS 2.

In the design of the foregoing solution, CORESETs in different beam directions are configured, so that a probability of successful LBT of the access network device is increased, and a DCI sending delay is reduced. However, blind detection overheads of the terminal device are increased.

Based on this, embodiments of this application provide an information transmission method and a communication apparatus, to reduce a control information sending delay, and reduce blind detection overheads on a device side that receives control information. The information transmission method provided in embodiments of this application may be applied to the foregoing communication system, for example, the communication system shown in FIG. 1. When the method is applied to the communication system shown in FIG. 1, a device that sends the control information may be an access network device, and a device that receives the control information may be a terminal device. In embodiments of this application, a plurality of monitoring positions may be configured on the terminal device side; the access network device may indicate a blind detection policy of the plurality of monitoring positions to the terminal device, or may configure the plurality of monitoring positions to be associated with transmission of same information; and the terminal device determines a blind detection policy of the plurality of monitoring positions.

With reference to specific embodiments, the following describes in detail a blind detection policy of a plurality of monitoring positions.

FIG. 4 shows an information transmission method. The method mainly includes the following procedure.

S401: A first device sends first configuration information to a second device.

The first configuration information is used to configure a plurality of monitoring positions. The second device may determine the plurality of monitoring positions based on the first configuration information, and the plurality of monitoring positions are used to perform detection on control information. In addition, it may be understood that the monitoring position may also be referred to as a monitoring occasion (MO) or another name. This is not limited in this embodiment of this application.

Specifically, the first device may be an access network device, and the second device may be a terminal device. For example, the control information may be downlink control information DCI.

Specifically, the first configuration information may include indication information of the plurality of monitoring positions, to directly indicate time-frequency positions corresponding to the monitoring positions. Alternatively, the first configuration information includes second configuration information and third configuration information. The second configuration information is used to configure frequency domain positions of the plurality of monitoring positions. The third configuration information is used to configure time domain positions of the plurality of monitoring positions. Alternatively, configuration information (such as identifiers and time-frequency positions) of the monitoring positions may be pre-deployed on the second device side, and the first device includes the identifiers of the plurality of monitoring positions in the first configuration information, so that the second device determines the plurality of monitoring positions based on the identifiers of the plurality of monitoring positions included in the first configuration information.

Optionally, the plurality of monitoring positions configured by using the first configuration information are associated. For example, the plurality of monitoring positions are all configured for transmitting a same piece of control information. The second device may determine the plurality of associated monitoring positions based on the first configuration information. Alternatively, it may be understood that the first configuration information may be further used to indicate association between the plurality of monitoring positions. A manner in which the first configuration information indicates association between the plurality of monitoring positions is specifically described in subsequent content.

Further, the first configuration information may further include receive spatial filtering parameter indication information associated with each of the plurality of monitoring positions. For example, the receive spatial filtering indication information may be specifically a transmission configuration indicator TCI. The TCI may be used to determine a receive spatial filtering parameter, or the TCI may indicate a receive spatial filtering parameter. Specifically, for any one of the plurality of monitoring positions, a TCI associated with the monitoring position may be used by the second device to determine a receive spatial filtering parameter used for blind detection at the monitoring position. The receive spatial filtering parameter may be the same as a receive spatial filtering parameter previously used to receive a type-D QCLed RS associated with the TCI, or may be adjusted based on the receive spatial filtering parameter previously used to receive the type-D QCLed RS associated with the TCI. The receive spatial filtering parameter may also be understood as a receive beam. Correspondingly, the first device uses a transmit spatial filtering parameter to send the control information at the monitoring position. The first device configures an associated TCI for the monitoring position. When the first device sends the control information at the monitoring position, the transmit spatial filtering parameter used may be the same as a transmit spatial filtering parameter used to send the type-D QCLed RS associated with the TCI. The transmit spatial filtering parameter may also be understood as a transmit beam.

Based on this, the second device may determine, based on a TCI associated with a monitoring position, a receive spatial filtering parameter to be used when performing detection on the control information through the monitoring position. Specifically, the second device may determine, based on a TCI associated with a monitoring position, a type-D QCLed RS associated with the TCI, and determine that a transmit spatial filtering parameter used by the first device to send the control information at the monitoring position is the same as or close to a transmit spatial filtering parameter to be used to send the type-D QCLed RS associated with the TCI. Then, the second device may determine, based on the transmit spatial filtering parameter corresponding to the type-D QCLed RS associated with the TCI and the previous beam training result, a receive spatial filtering parameter corresponding to the transmit spatial filtering parameter. When performing detection on the control information through the monitoring position, the second device may use the receive spatial filtering parameter corresponding to the TCI.

Optionally, at least two of the plurality of monitoring positions are associated with different pieces of receive spatial filtering parameter indication information. In other words, when the first device sends the control information at the plurality of monitoring positions, transmit spatial filtering parameters (or referred to as transmit beams) to be used to send the control information at the at least two monitoring positions are different. For example, the first device may perform LBT in a plurality of transmit beam directions, the plurality of monitoring positions are in a one-to-one correspondence with the plurality of transmit beam directions, and the different monitoring positions are associated with different pieces of TCI information. In addition, the first device may also use, based on an LBT result in each transmit beam direction, a corresponding transmit spatial filtering parameter when sending the control information at a monitoring position corresponding to successful LBT. In this manner, a success rate of LBT can be increased, and a delay of sending the control information can be reduced.

S402: The second device performs detection on the control information through a first monitoring position, and determines, based on a detection result, whether to perform detection on the control information through a second monitoring position.

The plurality of monitoring positions include the first monitoring position. For example, the first monitoring position is any one of the plurality of monitoring positions. The second monitoring position is any monitoring position other than the first monitoring position in the plurality of monitoring positions.

For example, the second device may determine, based on the detection result, whether to perform detection on the control information through the second monitoring position in the following manners: if the second device detects the control information through the first monitoring position, the second device skips performing detection on the control information through the second monitoring position; or if the second device does not detect the control information through the first monitoring position, the second device performs detection on the control information through the second monitoring position. It may be understood that the control information may indicate whether to perform detection on the control information through the second monitoring position.

In an optional implementation, the control information may be first DCI, and the first DCI is used for scheduling of data transmission of the second device, reporting of channel state information, and the like. If the second device detects the first DCI at the first monitoring position, the second device may determine that there is no need to perform detection on the control information at a monitoring position other than the first monitoring position.

Figures 5A, 5B:
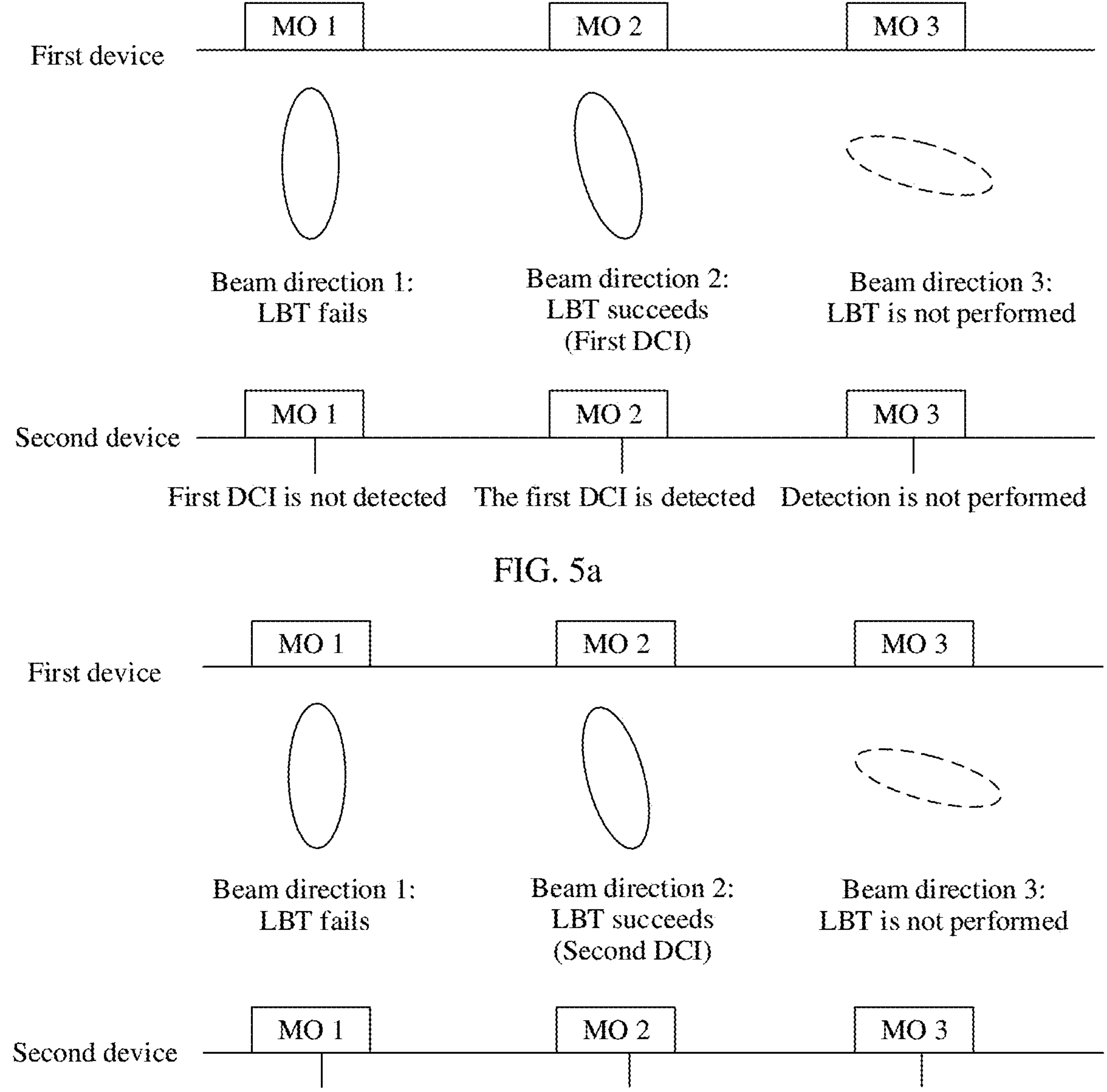
FIG. 5*a* is a schematic diagram of a procedure for performing detection on control information according to an embodiment of this application.
FIG. 5*b* is a schematic diagram of a procedure for performing detection on control information according to an embodiment of this application.

For example, FIG. 5*a* shows a procedure for performing detection on control information. The first device configures three monitoring positions for the second device, which are denoted as an MO 1, an MO 2, and an MO 3. Different monitoring positions are associated with different TCIs, that is, different monitoring positions are associated with different beam directions. When the first device needs to send the first DCI to the second device, the first device first performs LBT in a beam direction 1, but finds that the LBT fails because a channel in the direction is occupied by another device. Correspondingly, the second device, using a receive beam corresponding to the MO 1, does not detect the first DCI on the MO 1. Then, the first device performs LBT in a beam direction 2, and finds that no other device occupies a channel in the direction, that is, the LBT succeeds. In this case, the first device may send the first DCI on the MO 2 by using the beam direction 2 associated with the MO 2, and correspondingly, the second device may detect the first DCI on the MO 2 by using a receive beam corresponding to the MO 2. Subsequently, the first device no longer performs LBT in a beam direction 3, that is, the first device no longer sends the first DCI on the MO 3, and the second device no longer performs detection on the first DCI on the MO 3.

In another optional implementation, the control information may alternatively be newly defined second DCI. For example, the second DCI may be lightweight DCI, and the second DCI may only indicate that the first device does not need to send other control information at the plurality of monitoring positions. If the second device detects the second DCI at the first monitoring position, the second device may determine not to perform detection on the control information at a monitoring position other than the first monitoring position. Certainly, it may be understood that, in the foregoing another optional implementation, the second DCI may not be redefined, but another type of indication information is used to indicate that the first device does not need to send other control information in the plurality of monitoring positions, for example, a media access control layer control element (MAC CE). Alternatively, existing DCI may be improved (for example, 1-bit indication information is added), to indicate that the first device does not need to send other control information in the plurality of monitoring positions. During specific implementation, an improvement may be determined based on an actual situation. This is not limited in this embodiment of this application.

For example, FIG. 5*b* shows another procedure for performing detection on control information. The first device configures three monitoring positions for the second device, which are denoted as an MO 1, an MO 2, and an MO 3. Different monitoring positions are associated with different TCIs, that is, different monitoring positions are associated with different beam directions. When the first device has no actually required indication for data scheduling, reporting of channel state information, or the like for the second device, the first device may send second DCI to the second device, to indicate that detection may not be performed on DCI in the plurality of current MOs. The first device first performs LBT in a beam direction 1, but finds that the LBT fails because a channel in the direction is occupied by another device. Correspondingly, the second device, using a receive beam corresponding to the MO 1, does not detect the second DCI on the MO 1. Then, the first device performs LBT in a beam direction 2, and finds that no other device occupies a channel in the direction, that is, the LBT succeeds. In this case, the first device may send the second DCI on the MO 2 by using the beam direction 2 associated with the MO 2, and correspondingly, the second device may detect the second DCI on the MO 2 by using a receive beam corresponding to the MO 2. Subsequently, the first device no longer performs LBT in a beam direction 3, that is, the first device no longer sends the second DCI on the MO 3, and the second device no longer performs detection on the second DCI on the MO 3.

Optionally, a start time of the second monitoring position is not earlier than the first monitoring position. That is, after detecting, at the first monitoring position, that the control information is successfully decoded, the second device no longer performs detection on (or stops or skips detecting) the control information at another subsequent monitoring position. Based on such a design, when detecting the control information, the second device may stop performing detection on the control information at another subsequent monitoring position, so that energy consumption overheads can be reduced.

In this embodiment of this application, a plurality of monitoring positions used to perform detection on the control information are configured. After detecting the control information at one of the monitoring positions, the second device no longer performs detection on the control information at another monitoring position. This can reduce energy consumption overheads caused by detection at another monitoring position.

With reference to Example 1 to Example 3, an example in which the first configuration information includes the second configuration information and the third configuration information is used below to describe in detail a manner in which the first configuration information indicates association between a plurality of monitoring positions.

Example 1

(1) The first device may include configuration information of a first control resource set CORESET in the second configuration information.

The configuration information of the first CORESET may include some or all of the following content: duration of the first CORESET, for example, represented by a quantity of symbols occupied by the first CORESET; at least two transmission configuration indicators TCIs; and information that indicates a frequency domain position corresponding to the first CORESET. For example, the first CORESET may correspond to one frequency domain position, or the first CORESET may correspond to at least two frequency domain positions, and the at least two frequency domain positions are one-to-one associated with the at least two TCIs.

Specifically, the duration of the first CORESET and the frequency domain position corresponding to the first CORESET may be determined based on a control information capacity and/or a channel environment that the first device wants (or expects) to send.

The first device may determine, based on a result of beam training between the first device and the second device, the at least two TCIs included in the configuration information of the first CORESET. For example, the first device sends different reference signals by using different transmit spatial filtering parameters (or referred to as transmit beams), and the second device measures the reference signals (for example, source RSs). When measuring the reference signal, the second device may adjust a receive spatial filtering parameter (or referred to as a receive beam), to determine a receive beam, corresponding to a specific transmit beam, to be used by the second device to obtain a large channel gain. Optionally, the second device may report, to the first device, an index of at least one reference signal and reference signal received power (RSRP) corresponding to the index. For example, the second device reports, to the first device, at least one reference signal with large RSRP and RSRP corresponding to the at least one reference signal, so that the first device may correspondingly know which transmit beams to be used to send a signal, to enable the second device to obtain a large channel gain. In this way, the first device determines at least two TCIs based on the beam training result, where each TCI may include a type-D QCLed RS, and the type-D QCLed RS in each TCI is a reference signal in reference signals with large RSRP. The first device may include the at least two TCIs in the configuration information of the first CORESET.

Optionally, the first device may configure a first TCI list in the configuration information of the first CORESET, where the first TCI list includes the foregoing at least two TCIs. Specifically, the first device may configure the first TCI list in any one of the following manners A1 to A3.

A1: When a CORESET is configured by using higher layer signaling, a first TCI list corresponding to the first CORESET is directly configured.

Figure 6:
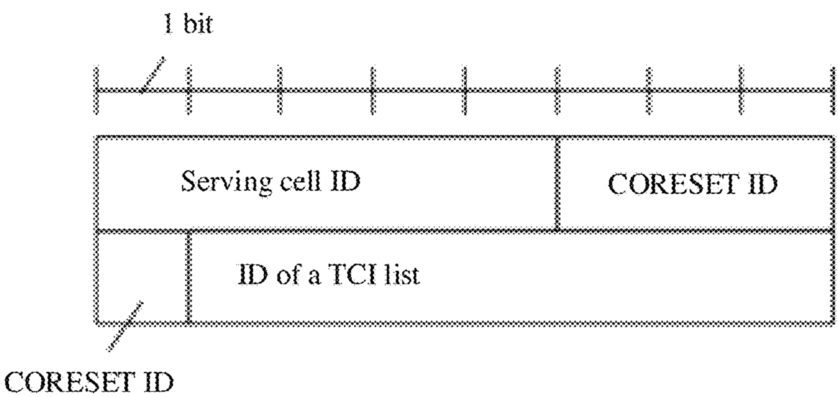
FIG. 6 is a schematic diagram of a structure of a first TCI list according to an embodiment of this application.

A2: When the CORESET is configured by using higher layer signaling, a plurality of TCI lists are configured, to activate, by using MAC CE signaling, one TCI list in the plurality of TCI lists as the first TCI list corresponding to the first CORESET. For example, FIG. 6 shows a format of an active MAC CE in the first TCI list. The MAC CE includes the following fields: an identifier (ID) of the TCI list, a serving cell ID, and a CORESET ID (indicating the first CORESET). Specifically, as shown in FIG. 6, the TCI list may occupy 16 bits. The ID of the TCI list occupies 7 bits, the serving cell ID occupies 4 bits, and the CORESET ID occupies 4 bits.

A3: When the CORESET is configured by using higher layer signaling, a plurality of TCIs are configured, and then a first TCI list is configured by using MAC CE signaling. The first TCI list includes a serving cell ID, a CORESET ID (indicating the first CORESET), and IDs of at least two TCIs, such as TCI ID 1, TCI ID 2, and TCI ID 3.

(2) The first device may include configuration information of a first search space SS in the third configuration information.

The first SS is associated with the first CORESET. The configuration information of the first SS may include some or all of the following content: information indicating the first CORESET, for example, an ID of the first CORESET; periodicity information of the first SS; or information indicating a plurality of time offsets in a same periodicity of the first SS.

Specifically, in the plurality of monitoring positions configured by the first device by using the first configuration information, any one of the monitoring positions is associated with one of the plurality of time offsets in the same periodicity. For example, the plurality of monitoring positions are in a one-to-one correspondence with the plurality of time offsets in the same periodicity, and monitoring positions corresponding to the plurality of time offsets in the same periodicity of the first SS are associated.

In the plurality of time offsets in the same periodicity of the first SS, any one of the time offsets is associated with one of the at least two TCIs corresponding to the first CORESET. The association relationship is used to indicate that when the first device sends control information at a monitoring position associated with a time offset, there is a QCL relationship between the control information and a reference signal (namely, a source RS) in a TCI associated with the time offset. Alternatively, there is a QCL relationship between a demodulation reference signal DMRS of the control information and a reference signal (namely, a source RS) in a TCI associated with the time offset.

Optionally, an offset list may be configured in the first SS, and the offset list includes a plurality of time offsets in a same periodicity. In an optional implementation, a quantity of time offsets included in the offset list may be the same as a quantity of TCs included in the first TCI list of the first CORESET, and the time offsets and the TCIs may be associated one by one in an order of configuration. In another optional implementation, the quantity of time offsets included in the offset list may be different from the quantity of TCs included in the first TCI list of the first CORESET. In this case, the first device may indicate an association relationship between the time offset and the TCI by using additional configuration information. The configuration information may be included in the configuration information of the first SS, or may be independent configuration information.

Specifically, the first device may configure the plurality of time offsets in a same periodicity with reference to the following two optional implementations.

In an optional implementation, the time offset includes a slot offset represented by an offset position amount expressed in a quantity of slots. In a same periodicity in the first SS, a plurality of offset position amounts expressed in a quantity of slots may be used to represent a plurality of slot offsets in the periodicity. Specifically, the configuration information of the first SS may include the following fields:

monitoring slot periodicity and offset list (monitoringSlotPeriodicityAndOffsetList), where the monitoring slot periodicity and offset list field indicates a periodicity expressed in slots and a plurality of slot offsets in each periodicity, a quantity of slot offsets included in a same periodicity may be the same as the quantity of TCs included in the first TC list of the first CORESET, and the slot offsets and the TCIs may be associated one by one in an order of configuration; and monitoring symbols within slot (monitoringSymbolsWithinSlot), where the monitoring symbols within slot filed indicates a start monitoring symbol occupied by the first SS in a slot when the first SS is located at in the slot (for example, the slot corresponding to the slot offset). It may be understood that a time position (for example, a start time position) configured for the first SS may be determined by the plurality of slot offsets included in each periodicity of the first SS and the start monitoring symbol occupied by the first SS in the slot. In addition, the quantity of slots included in the first SS may be indicated by a duration field in the configuration information of the first CORESET.

In this manner, the first configuration information may indicate that the plurality of monitoring positions are in a same periodicity as the first SS, and the plurality of monitoring positions may be in a one-to-one correspondence with the plurality of slot offsets in a same periodicity. It may be understood that the plurality of monitoring positions in the same periodicity are associated. The second device can reduce unnecessary blind detection overheads by using a related blind detection policy.

Figure 7A:
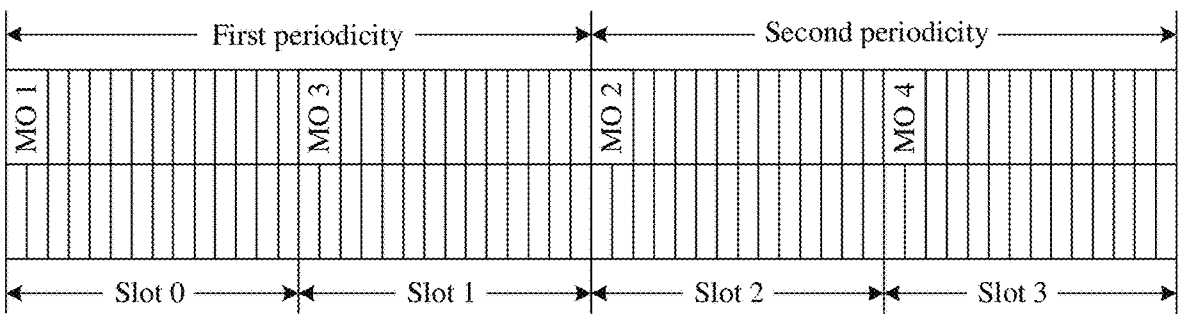
FIG. 7*a* is a schematic diagram of a configuration mode of monitoring positions according to an embodiment of this application.

For example, FIG. 7*a* shows a configuration mode of monitoring positions according to an embodiment of this application. The configuration information of the first CORSET includes one frequency domain position, duration of the first CORSET, and two TCIs, namely, a TCI 1 and a TCI 2. The duration of the first CORSET is two symbols. The configuration information of the first SS includes a periodicity indication, each periodicity includes two slots, and each slot includes 14 symbols. The monitoring slot periodicity and offset list includes two slot offsets, where one of the slot offsets is 0 slots, and a corresponding start monitoring symbol is a first symbol (namely, a symbol 0) in a first slot in a periodicity; and the other slot offset is 1 slot, and a corresponding start monitoring symbol is a first symbol (namely, a symbol 0) in a second slot in the periodicity. Certainly, it may be understood that start monitoring symbols corresponding to different slot offsets may be the same or different. This is not limited in this embodiment of this application.

FIG. 7*a* specifically shows two monitoring positions in a same periodicity. For example, the first SS includes a slot 0 and a slot 1 in a first periodicity, that is, includes an MO 1 and an MO 3 in the first periodicity. A slot offset associated with the MO 1 is 0, the MO 1 is associated with a TCI 1, and a corresponding start monitoring symbol in the slot 0 is a symbol 0. A slot offset associated with the MO 3 is 1, the MO 3 is associated with a TCI 2, and a corresponding start monitoring symbol in the slot 1 is a symbol 0. The MO 1 and the MO 3 are two associated monitoring positions. The second device may determine, by detecting a detection result of the control information on the MO 1, whether to perform detection on the control information on the MO 3. For another example, the first SS includes a slot 2 and a slot 3 in a second periodicity, that is, includes an MO 2 and an MO 4 in the second periodicity. A slot offset associated with the MO 2 is 0, the MO 2 is associated with a TCI 1, and a corresponding start monitoring symbol in the slot 2 is a symbol 0. A slot offset associated with the MO 4 is 1, the MO 4 is associated with a TCI 2, and a corresponding start monitoring symbol in the slot 3 is a symbol 0. The MO 2 and the MO 4 are two associated monitoring positions. The second device may determine, by detecting a detection result of the control information on the MO 2, whether to perform detection on the control information on the MO 4.

In another optional implementation, the time offset may be determined by using the slot offset and the start monitoring symbol in the slot. In a same periodicity in the first SS, a monitoring slot indicated by a slot offset may be included. The monitoring slot is a slot in which a monitoring position exists. A bitmap is configured for a quantity of symbols included in the monitoring slot. The bitmap indicates a position of a start monitoring symbol in the monitoring slot. For example, if the slot includes 14 symbols, a bitmap including 14 bits is configured, and an $x^{th}$ bit in the bitmap corresponds to an $x^{th}$ symbol in the slot. When a bit corresponding to a symbol in the bitmap is a first value, it indicates that the symbol is a position of a start monitoring symbol in the slot. The first value may be 1 or 0. Specifically, the configuration information of the first SS may include the following fields:

monitoring slot periodicity and offset (monitoringSlotPeriodicityAndOffset), where the monitoring slot periodicity and offset field indicates a periodicity expressed in slots and one slot offset in each periodicity; and monitoring symbols within slot-listen before talk (monitoringSymbolsWithinSlot-LBT), where the monitoring symbols within slot-listen before talk field in the monitoring slot indicates a bitmap, and a quantity of bits included in the bitmap is the same as a quantity of symbols in a slot indicated by the foregoing slot offset, for example, both are 14 or 12. When a bit corresponding to a symbol is 1 (or 0), it indicates that the symbol is a start monitoring symbol in the slot indicated by the slot offset. A quantity of start monitoring symbols included in the slot may be the same as the quantity of TCs included in the first TCI list of the first CORESET, and the start monitoring symbols and the TCIs may be associated one by one in an order of configuration.

In this manner, the first configuration information may indicate that the plurality of monitoring positions are in one monitoring slot in the same periodicity of the first SS, and the plurality of monitoring positions may be in a one-to-one correspondence with the plurality of start monitoring symbols in the monitoring slot. It may be understood that the plurality of monitoring positions in a same monitoring slot are associated, and the second device may reduce unnecessary blind detection overheads by using a related blind detection policy.

Figure 7B:
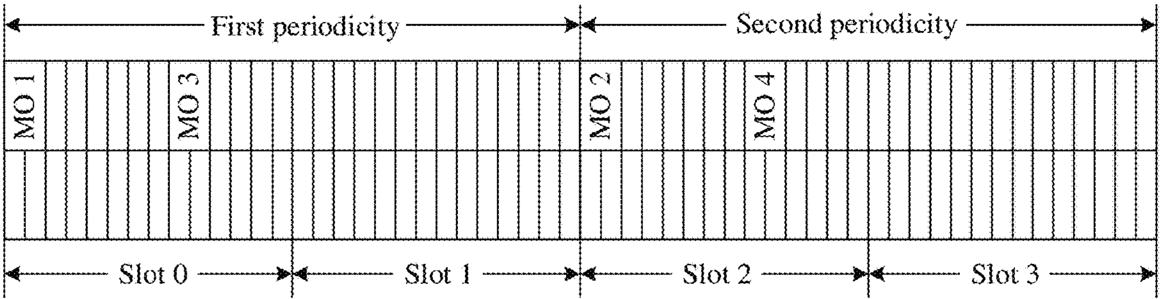
FIG. 7*b* is a schematic diagram of a configuration mode of monitoring positions according to an embodiment of this application.

For example, FIG. 7*b* shows another configuration mode of monitoring positions according to an embodiment of this application. The configuration information of the first COREST includes one frequency domain position, duration of the first CORSET, and two TCIs, namely, a TCI 1 and a TCI 2. The duration of the first CORSET is two symbols. The configuration information of the first SS includes a periodicity indication, each periodicity includes two slots, and indicates that a slot offset of a monitoring slot is 0; and each slot includes 14 symbols. A first bit and a ninth bit in the bitmap corresponding to the monitoring symbols within slot-listen before talk are configured as 1. In other words, two start monitoring symbols are configured in the monitoring slot. One start monitoring symbol is a first symbol (namely, a symbol 0) in the slot, and the other start monitoring symbol is a ninth symbol (namely, a symbol 8) in the slot. Alternatively, it may be understood that each periodicity includes two time offsets, and each time offset is determined by the slot offset of the monitoring slot and a start monitoring symbol in the monitoring slot. Specifically, one of the time offsets is determined by a slot offset 0 and the symbol 0 in the slot, and the other time offset is determined by the slot offset 0 and the symbol 8 in the slot.

FIG. 7*b* specifically shows that a monitoring slot in each periodicity includes two monitoring positions. For example, a monitoring slot (namely, the slot 0) of the first SS in the first periodicity includes an MO 1 and an MO 3, where a start monitoring symbol associated with the MO 1 is a symbol 0, and the MO 1 is associated with a TC 1; and a start monitoring symbol associated with the MO 3 is a symbol 8, and the MO 3 is associated with a TCI 2. The MO 1 and the MO 3 are two associated monitoring positions. The second device may determine, by detecting a detection result of the control information on the MO 1, whether to perform detection on the control information on the MO 3. For another example, a monitoring slot (namely, the slot 2) of the first SS in the second periodicity includes an MO 2 and an MO 4, where a start monitoring symbol associated with the MO 2 is a symbol 0, and the MO 2 is associated with a TCI 1; and a start monitoring symbol associated with the MO 4 is a symbol 8, and the MO 4 is associated with a TCI 2. The MO 2 and the MO 4 are two associated monitoring positions. The second device may determine, by detecting a detection result of the control information on the MO 2, whether to perform detection on the control information on the MO 4.

Example 2

(1) The access network device may include configuration information of a first control resource set CORESET in the second configuration information.

Specifically, refer to implementation of (1) in Example 1. Details are not described in this embodiment of this application again.

(2) The access network device may include configuration information of a plurality of second search spaces SSs in the third configuration information.

The plurality of second SSs are associated with the first CORESET, any one of the plurality of second SSs is associated with one of the at least two TCIs, and any one of the plurality of monitoring positions is associated with one of the plurality of second SSs.

Specifically, configuration information of the second SS may include some or all of the following content: information indicating the first CORESET, for example, an ID of the first CORESET; second indication information (or referred to as TCI indication information), where the second indication information is used as a TCI that is in the first CORESET and that is associated with the second SS; periodicity information of the second SS; a time offset (expressed in slots) that indicates a monitoring slot in each periodicity; or a start monitoring symbol position in a monitoring slot.

Optionally, the plurality of second SSs include same periodicity information, and monitoring positions corresponding to the plurality of second SSs in a same periodicity are associated.

In addition, the access network device may further include, in the first configuration information, information indicating association between the plurality of second SSs. For example, configuration information of each of the plurality of second SSs further includes an association identifier. Association identifiers in the configuration information of the plurality of second SSs may be the same, to indicate that the plurality of second SSs having a same association identifier are associated, that is, the monitoring positions corresponding to the plurality of second SSs are associated. For another example, the access network device may separately configure one piece of third indication information in the first configuration information. The third indication information indicates that the plurality of second SSs configured in the third configuration information are associated, or the third indication information may directly indicate that monitoring positions corresponding to the plurality of second SSs in a same periodicity are associated.

In this example, the first configuration information may indicate that the plurality of monitoring positions are in the same periodicity corresponding to the plurality of second SSs, and the plurality of monitoring positions may be in a one-to-one correspondence with a plurality of slot offsets in the same periodicity. It may be understood that the plurality of monitoring positions in a same periodicity are associated, and the terminal device may reduce unnecessary blind detection overheads by using a related blind detection policy.

Example 3

(1) The access network device includes configuration information of a plurality of second control resource sets CORESETs in the second configuration information.

The configuration information of each of the second CORESETs may include some or all of the following: a frequency domain position of the CORESET, duration (for example, expressed by a quantity of symbols) of the CORESET, a resource mapping mode, and a transmission configuration indicator TCI. Frequency domain positions of different second CORESETs may be the same or different.

(2) The access network device includes configuration information of a plurality of second search spaces SSs in the third configuration information.

Any one of the plurality of second SSs is associated with one of the plurality of second CORESETs, and any one of the plurality of monitoring positions is associated with one of the plurality of second SSs.

Specifically, the configuration information of the second SS may include some or all of the following content: information indicating a second CORESET associated with the second SS; periodicity information of the second SS; a time offset (expressed in slots) that indicates a monitoring slot in each periodicity; or a start monitoring symbol position in a monitoring slot.

In addition, the access network device may further include, in the first configuration information, information indicating association between the plurality of second SSs. For example, configuration information of each of the plurality of second SSs further includes an association identifier. Association identifiers in the configuration information of the plurality of second SSs may be the same, to indicate that the plurality of second SSs having a same association identifier are associated, that is, the monitoring positions corresponding to the plurality of second SSs are associated. For another example, the access network device may separately configure one piece of third indication information in the first configuration information. The third indication information indicates that the plurality of second SSs configured in the third configuration information are associated, or the third indication information may directly indicate that monitoring positions corresponding to the plurality of second SSs in a same periodicity are associated.

In this example, the first configuration information may indicate that the plurality of monitoring positions are in the same periodicity corresponding to the plurality of second SSs, and the plurality of monitoring positions may be in a one-to-one correspondence with a plurality of slot offsets in the same periodicity. It may be understood that the plurality of monitoring positions in a same periodicity are associated, and the terminal device may reduce unnecessary blind detection overheads by using a related blind detection policy.

For example, FIG. 8 shows a configuration mode of monitoring positions according to an embodiment of this application. The first configuration information includes configuration information of two second CORESTs and configuration information of two second SSs. The configuration information of each second CORESET includes a frequency domain position of the second CORSET, duration of the second CORSET, and a TCI. Frequency domain positions of the two second CORESETs are different. Duration of each of the two second CORSETs is two symbols. TCIs associated with the two second CORESETs are different. For example, configuration information of one of the two CORESETs includes a TCI 1, and configuration information of the other CORESET includes a TCI 2. The configuration information of each second SS includes periodicity indication information, each periodicity includes two slots, and each slot includes 14 symbols. The configuration information of each second SS includes a start monitoring symbol position in a monitoring slot. For example, the configuration information of each second SS includes slot offsets of two monitoring slots. One of the slot offsets is 0 slots, and a corresponding start monitoring symbol is a first symbol (namely, a symbol 0) in a first slot in a periodicity; and the other slot offset is 1 slot, and a corresponding start monitoring symbol is a first symbol (namely, a symbol 0) in a second slot in the periodicity. Certainly, it may be understood that start monitoring symbols corresponding to different slot offsets may be the same or different. This is not limited in this embodiment of this application.

FIG. 8 specifically shows two monitoring positions in a same periodicity.

For example, the second SS includes a slot 0 and a slot 1 in a first periodicity, that is, includes an MO 1 and an MO 3 in the first periodicity. A slot offset associated with the MO 1 is 0, the MO 1 is associated with a second CORESET corresponding to the TCI 1, and a corresponding start monitoring symbol in the slot 0 is a symbol 0. A slot offset associated with the MO 3 is 1, the MO 3 is associated with a second CORESET corresponding to the TCI 2, and a corresponding start monitoring symbol in the slot 1 is a symbol 0. If a frequency domain position of the second CORESET corresponding to the TCI 1 is different from a frequency domain position of the second CORESET corresponding to the TCI 2, frequency domain positions of the MO 1 and the MO 3 are different. The MO 1 and the MO 3 are two associated monitoring positions. The second device may determine, by detecting a detection result of the control information on the MO 1, whether to perform detection on the control information on the MO 3.

For another example, the second SS includes a slot 2 and a slot 3 in a second periodicity, that is, includes an MO 2 and an MO 4 in the second periodicity. A slot offset associated with the MO 2 is 0, the MO 2 is associated with a second COREST corresponding to a TCI 1, and a corresponding start monitoring symbol in the slot 2 is a symbol 0. A slot offset associated with the MO 4 is 1, the MO 4 is associated with a second CORESET corresponding to a TCI 2, and a corresponding start monitoring symbol in the slot 3 is a symbol 0. If a frequency domain position of the second CORESET corresponding to the TCI 1 is different from a frequency domain position of the second CORESET corresponding to the TCI 2, frequency domain positions of the MO 2 and the MO 4 are different. The MO 2 and the MO 4 are two associated monitoring positions. The second device may determine, by detecting a detection result of the control information on the MO 2, whether to perform detection on the control information on the MO 4.

FIG. 9 shows an information transmission method. The method mainly includes the following procedure.

S901: A first device sends first configuration information to a second device.

The first configuration information is used to configure a plurality of monitoring positions and receive spatial filtering parameter indication information (for example, a transmission configuration indicator TCI) associated with each of the plurality of monitoring positions, and the plurality of monitoring positions are used to perform detection on control information. The second device may determine the plurality of monitoring positions based on the first configuration information. Specifically, refer to S401 for implementation. Details are not described in this embodiment of this application again.

Specifically, the first device may be an access network device, and the second device may be a terminal device. For example, the control information may be downlink control information DCI.

The first configuration information including second configuration information and third configuration information is used as an example. For a manner in which the first configuration information indicates association between the plurality of monitoring positions, refer to the foregoing Example 1 to Example 3 for implementation. Details are not described in this embodiment of this application again.

S902: The second device performs detection on first indication information in the control information through a first monitoring position, and determines, based on a detection result, whether to perform detection on the control information through a second monitoring position.

The plurality of monitoring positions include the first monitoring position. For example, the first monitoring position is any one of the plurality of monitoring positions. The second monitoring position is any monitoring position other than the first monitoring position in the plurality of monitoring positions.

Specifically, the first indication information indicates to perform detection on the control information through the second monitoring position or not to perform detection on the control information through the second monitoring position. If the second device detects the first indication information through the first monitoring position, the second device determines, based on the first indication information, whether to perform detection on the control information through the second monitoring position. Specifically, for example, if the first indication information indicates to perform detection on the control information through the second monitoring position, when detecting the first indication information at the first monitoring position, the second device may continue to perform detection on the control information through the second monitoring position. For another example, if the first indication information indicates not to perform detection on the control information through the second monitoring position, when detecting the first indication information at the first monitoring position, the second device no longer performs detection on the control information through the second monitoring position. In addition, if the second device does not detect the first indication information through the first monitoring position, the second device may further perform detection on the control information through the second monitoring position.

Optionally, a start time of the second monitoring position is not earlier than the first monitoring position. It may be understood that the first indication information in the control information may also specifically indicate whether to perform detection on the control information through another subsequent monitoring position. For example, the second device detects the control information at the first monitoring position, and the first indication information in the control information indicates not to perform detection on the control information through another subsequent monitoring position. In this case, after successfully decoding the control information, the second device no longer performs detection on (or stops or skips detecting) the control information at another subsequent monitoring position. Based on such a design, when detecting the control information, the second device may stop performing detection on the control information at another subsequent monitoring position, so that energy consumption overheads can be reduced.

Figure 10:
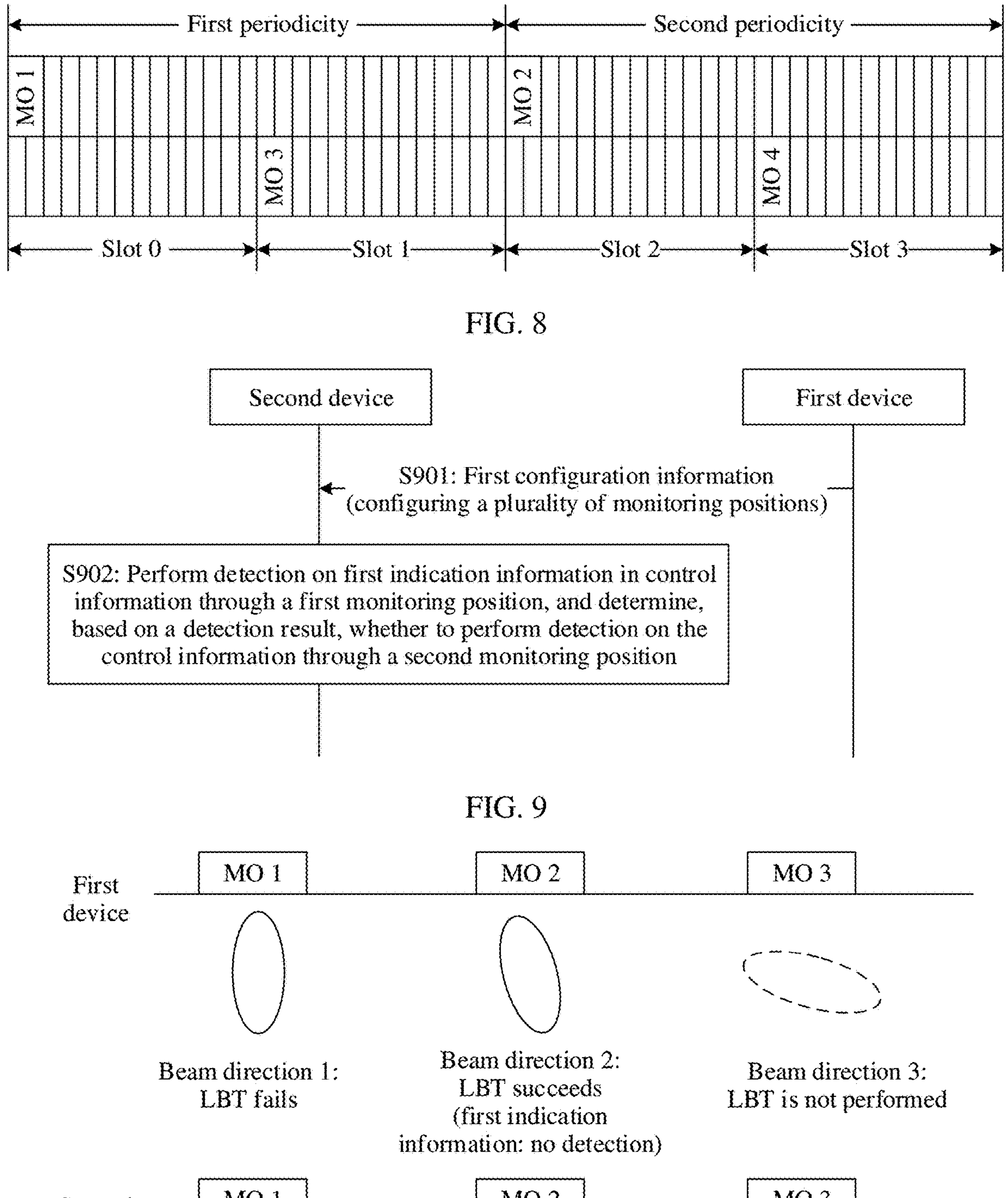
FIG. 10 is a schematic diagram of a procedure for performing detection on control information according to an embodiment of this application.

For example, FIG. 10 shows a procedure for performing detection on control information. The first device configures three monitoring positions for the second device, which are denoted as an MO 1, an MO 2, and an MO 3. Different monitoring positions are associated with different TCIs, that is, different monitoring positions are associated with different transmit beam directions. When the first device needs to send the control information (including the first indication information) to the second device, the first device first performs LBT in a beam direction 1, but finds that the LBT fails because a channel in the direction is occupied by another device. Correspondingly, the second device does not detect the first indication information in the control information on the MO 1. Then, the second device performs LBT in a beam direction 2, and finds that no other device occupies a channel in the direction, that is, the LBT succeeds. In this case, the first device may send the control information on the MO 2 by using the beam direction 2 associated with the MO 2. In addition, the first device does not need to send additional control information on the MO 3. Therefore, the first indication information in the control information sent by the first device in the beam direction 2 indicates not to perform detection on the control information through another subsequent monitoring position. Correspondingly, the first device no longer performs LBT in a beam direction 3 subsequently, and no longer sends the control information on the MO 3. After detecting the first indication information in the control information on the MO 2, the second device no longer performs detection on the control information on the MO 3.

In this embodiment of this application, the first device indicates, by using the first indication information, a blind detection policy at the plurality of monitoring positions for the second device, so that unnecessary blind detection overheads on the second device side can be reduced.

Figures 11, 12:
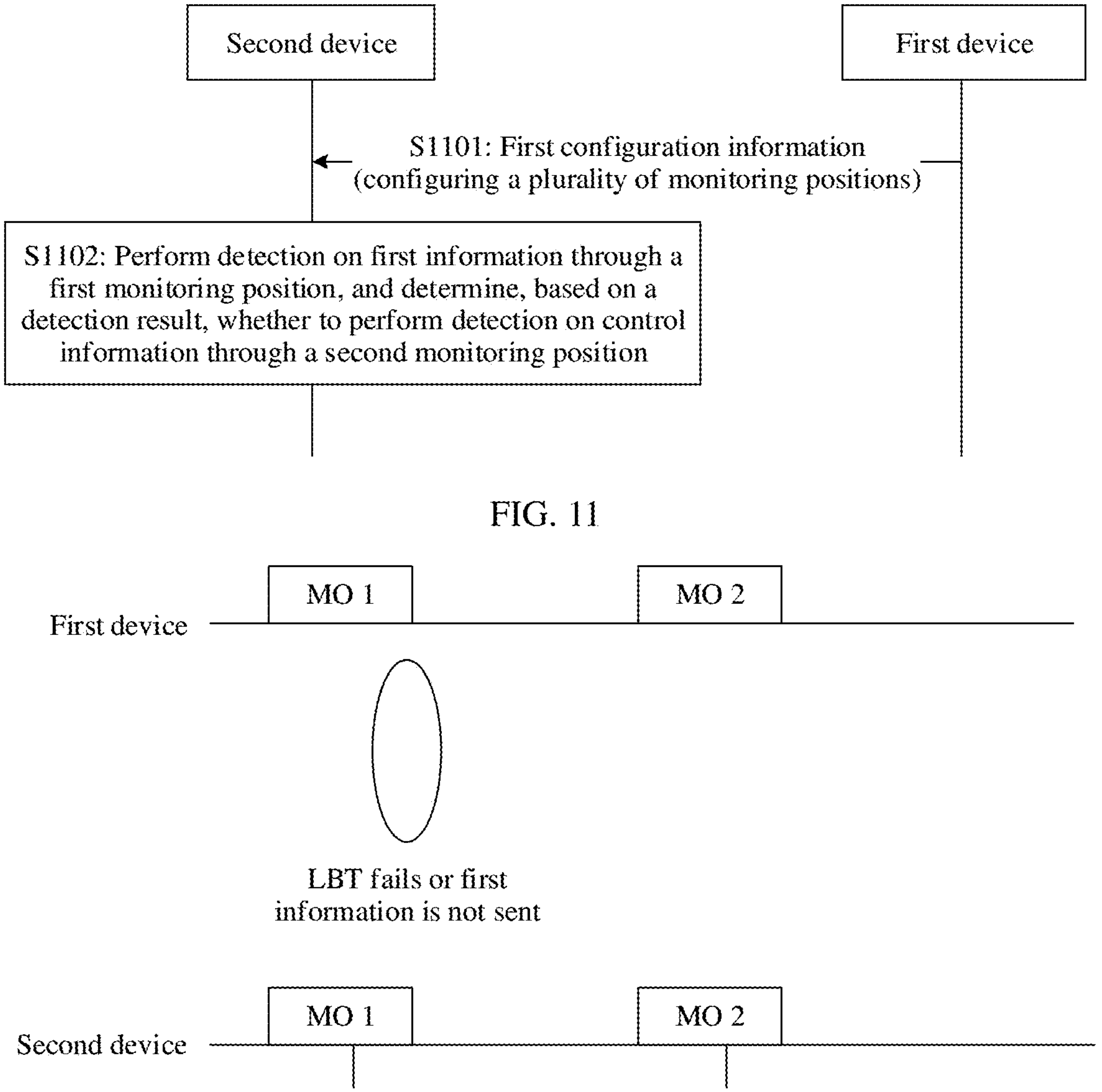
FIG. 11 is a schematic flowchart of an information transmission method according to an embodiment of this application.
FIG. 12 is a schematic diagram of a procedure for performing detection on first information according to an embodiment of this application.

FIG. 11 shows an information transmission method. The method mainly includes the following procedure.

S101: A first device sends first configuration information to a second device.

The first configuration information is used to configure a plurality of monitoring positions and receive spatial filtering parameter indication information (for example, a transmission configuration indicator TCI) associated with each of the plurality of monitoring positions, and the plurality of monitoring positions are used to perform detection on control information. In addition, it may be understood that the monitoring position may also be referred to as a monitoring occasion (MO) or another name. This is not limited in this embodiment of this application.

Specifically, the plurality of monitoring positions are associated with a same TCI. Alternatively, it may be understood that in S101, the first device configures a plurality of monitoring positions in a transmit beam direction corresponding to a same transmit spatial filtering parameter. If the first device sends control information at the plurality of monitoring positions, transmit spatial filtering parameters used by the first device at the plurality of monitoring positions are the same. Correspondingly, receive spatial filtering parameters used by the second device for blind detection at the plurality of monitoring positions are also the same. Optionally, the first device may be an access network device, and the second device may be a terminal device. For example, the control information may be downlink control information DCI.

Specifically, the first configuration information may include indication information of the plurality of monitoring positions, to directly indicate time-frequency positions corresponding to the monitoring positions. Alternatively, the first configuration information includes second configuration information and third configuration information. The second configuration information is used to configure frequency domain positions of the plurality of monitoring positions. The third configuration information is used to configure time domain positions of the plurality of monitoring positions. Alternatively, configuration information (such as identifiers and time-frequency positions) of the monitoring positions may be pre-deployed on the second device side, and the first device includes the identifiers of the plurality of monitoring positions in the first configuration information, so that the second device determines the plurality of monitoring positions based on the identifiers of the plurality of monitoring positions included in the first configuration information.

Optionally, the plurality of monitoring positions configured by using the first configuration information are associated. The second device may determine the plurality of associated monitoring positions based on the first configuration information. Alternatively, it may be understood that the first configuration information may further indicate association between the plurality of monitoring positions.

Optionally, the plurality of monitoring positions are maximally close in time. For example, time positions of the plurality of monitoring positions may be within a same preconfigured periodicity range.

For example, the first configuration information includes second configuration information and third configuration information. The second configuration information includes configuration information of a second control resource set CORESET, and the configuration information of the second CORESET includes a TCI. The third configuration information includes configuration information of a third search space SS. The configuration information of the third SS includes information indicating a plurality of time offsets in a same periodicity. The plurality of time offsets in the same periodicity are associated with a same TCI, and the same TCI may be a TCI included in the configuration information of the second CORESET. Any one of the plurality of monitoring positions is associated with one of the plurality of time offsets in the same periodicity, and monitoring positions corresponding to the plurality of time offsets in the same periodicity are associated.

For example, the first configuration information includes second configuration information and third configuration information. The second configuration information includes configuration information of a second control resource set CORESET, and the configuration information of the second CORESET includes a TCI. The third configuration information includes configuration information of a plurality of fourth search spaces SSs, and configuration information of each fourth SS includes a time offset and periodicity information. The first configuration information further includes information indicating association between the plurality of fourth SSs. The plurality of fourth SSs are associated with a same TCI, and the same TCI may be a TCI included in the configuration information of the second CORESET. Any one of the plurality of monitoring positions is associated with one of the plurality of fourth SSs, the plurality of fourth SSs include same periodicity information, and monitoring positions corresponding to the plurality of fourth SSs in a same periodicity are associated. Further, the first device may further set the first monitoring position in the plurality of monitoring positions as a monitoring position for sending first information. The first information may indicate to perform detection on the control information through the plurality of monitoring positions. It may be understood that the first monitoring position is a predetermined monitoring position in the plurality of monitoring positions. The first device may determine any monitoring position in the plurality of monitoring positions as the first monitoring position; or the first device may determine a monitoring position earlier in time in the plurality of monitoring positions as the first monitoring position. For example, if the second monitoring position is any monitoring position other than the first monitoring position in the plurality of monitoring positions, a start time of the second monitoring position is not earlier than the first monitoring position. In addition, it should be noted that the first monitoring position may also be understood as a primary monitoring position, and the second monitoring position may also be understood as a secondary monitoring position. Certainly, the first monitoring position may also be referred to as another name, and the second monitoring position may also be referred to as another name. This is not limited in this embodiment of this application.

Optionally, the first device may further indicate, in the first configuration information, information about the first monitoring position. For example, the first device may specifically separately configure, in the first configuration information, information indicating the first monitoring position. Alternatively, the first device may add a related identifier to configuration information of a fourth SS associated with the first monitoring position, to indicate, through the related identifier, that a monitoring position associated with the fourth SS is the predetermined monitoring position, namely, the first monitoring position. In this way, the second device learns that when obtaining the first configuration information, the second device needs to perform detection on the first information at the first monitoring position.

S1102: The second device detects the first information through the first monitoring position, and determines, based on a detection result, whether to perform detection on the control information through the second monitoring position.

For example, when the first device performs LBT in a transmit beam direction, if the LBT succeeds and the first device needs to send control information in the transmit beam direction, the first device may send the first information at the first monitoring position. If the second device detects the first information at the first monitoring position, the second device can determine that the first device needs to send the control information in the transmit beam direction. Then, the second device may perform detection on the control information at another monitoring position corresponding to the transmit beam direction. If LBT performed by the first device succeeds in the beam direction but the first device does not need to send the control information in the transmit beam direction, or LBT performed by the first device fails in the beam direction, the first device does not send the first information at the first monitoring position, and the second device does not detect the first information at the first monitoring position. If the second device does not detect the first information at the first monitoring position, the second device may determine that detection does not need to be performed on the control information at another monitoring position corresponding to the transmit beam direction.

Specifically, for example, the second monitoring position is any monitoring position other than the first monitoring position in the plurality of monitoring positions. If the second device detects the first information through the first monitoring position, the second device performs detection on the control information through the second monitoring position. Alternatively, if the second device does not detect the first information through the first monitoring position, the second device does not perform detection on the control information through the second monitoring position.

For example, FIG. 12 shows a procedure for performing detection on first information. The first device configures a plurality of monitoring positions for the second device in a same beam direction. FIG. 12 shows an MO 1 and an MO 2. The MO 1 is a predetermined monitoring position, and a start time of the MO 2 is not earlier than the MO 1. When LBT performed by the first device in the beam direction fails, or LBT performed by the first device in the beam direction succeeds but the first information is not sent on the MO 1, the second device does not detect the first information on the MO 1. In addition, the first device does not send any information on the MO 2, and the second device does not perform detection on the control information on the MO 2.

In this embodiment of this application, a plurality of monitoring positions used to perform detection on the control information are configured for a same beam direction, and the first device indicates, by using the first information, a detection policy at the plurality of monitoring positions for the second device. This can reduce unnecessary blind detection overheads on the second device side.

The foregoing separately describes the methods provided in embodiments of this application from a perspective of interaction between the first device and the second device. To implement functions in the foregoing methods, the first device and the second device may include a hardware structure and/or a software module, and implement the foregoing functions in a form of the hardware structure, the software module, or a combination of the hardware structure and the software module. Whether a specific function in the foregoing functions is performed by using the hardware structure, the software module, or the combination of the hardware structure and the software module depends on a specific application and a design constraint of the technical solutions.

Figure 13:
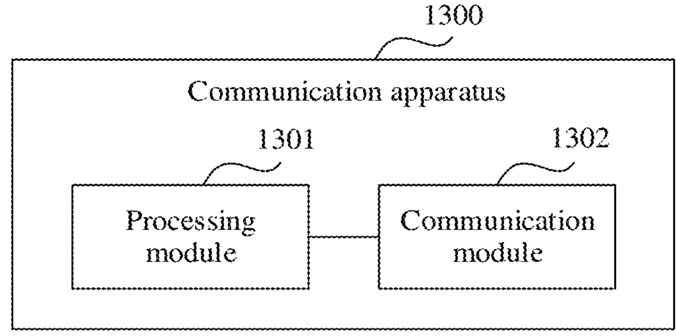
FIG. 13 is a schematic diagram of a structure of a communication apparatus according to an embodiment of this application.

Based on a same concept, as shown in FIG. 13, an embodiment of this application provides a communication apparatus 1300. The communication apparatus 1300 includes a processing module 1301 and a communication module 1302. The communication apparatus 1300 may be a first device (for example, an access network device), or may be a communication apparatus that is used in a first device or matched with a first device for use and that can implement a communication method performed on the first device side. Alternatively, the communication apparatus 1300 may be a second device (for example, a terminal device), or may be a communication apparatus that is used in a second device or matched with a second device for use and that can implement a communication method performed on the second device side.

The communication module may also be referred to as a transceiver module, a transceiver, a transceiver apparatus, or the like. The processing module may also be referred to as a processor, a processing board, a processing unit, a processing apparatus, or the like. Optionally, a component that is in the communication module and that is configured to implement a receiving function may be considered as a receiving unit. It should be understood that the communication module is configured to perform a sending operation and a receiving operation on an access network device side or a terminal device side in the foregoing method embodiments, and a component that is in the communication module and that is configured to implement a sending function is considered as a sending unit. In other words, the communication module includes a receiving unit and a sending unit.

For example, the first device is an access network device, and the second device is a terminal device. When the communication apparatus 1300 is used in the terminal device, the receiving unit included in the communication module 1302 of the communication apparatus 1300 is configured to perform a receiving operation on the terminal device side, for example, receiving a downlink signal from the access network device. The sending unit included in the communication module 1302 is configured to perform a sending operation on the terminal device side, for example, sending an uplink signal to the access network device. When the communication apparatus 1300 is used in the access network device, the receiving unit included in the communication module 1302 of the communication apparatus 1300 is configured to perform a receiving operation on the access network device side, for example, receiving an uplink signal from the terminal device. The sending unit included in the communication module 1302 of the communication apparatus 1300 is configured to perform a sending operation on the access network device side, for example, send a downlink signal to the terminal device. In addition, it should be noted that, if the apparatus is implemented by using a chip/chip circuit, the communication module may be an input/output circuit and/or a communication interface, and performs an input operation (corresponding to the foregoing receiving operation) and an output operation (corresponding to the foregoing sending operation). The processing module is an integrated processor, a microprocessor, or an integrated circuit.

With reference to a first manner and a second manner, the following describes in detail an implementation in which the communication apparatus 1300 is used in the second device (for example, the terminal device).

In the first manner, the communication apparatus 1300 includes:

- a communication module 1302, configured to obtain first configuration information, where the first configuration information is used to configure a plurality of monitoring positions and receive spatial filtering parameter indication information associated with each of the plurality of monitoring positions, the plurality of monitoring positions are used to perform detection on control information, and at least two of the plurality of monitoring positions are associated with different pieces of receive spatial filtering parameter indication information; and
- a processing module 1301, configured to perform detection on the control information through a first monitoring position, and determine, based on a detection result, whether to perform detection on the control information through a second monitoring position, where the plurality of monitoring positions include the first monitoring position, and the second monitoring position is any monitoring position other than the first monitoring position in the plurality of monitoring positions.

In an optional implementation of the first manner, a start time of the second monitoring position is not earlier than the first monitoring position.

In an optional implementation of the first manner, the processing module 1301 is specifically configured to: if the control information is detected through the first monitoring position, skip performing detection on the control information through the second monitoring position; or if the control information is not detected through the first monitoring position, perform detection on the control information through the second monitoring position.

In an optional implementation of the first manner, the processing module 1301 is specifically configured to perform detection on first indication information in the control information through the first monitoring position, where the first indication information indicates to perform detection on the control information through the second monitoring position or not to perform detection on the control information through the second monitoring position.

In an optional implementation of the first manner, the first monitoring position is any one of the plurality of monitoring positions.

In an optional implementation of the first manner, the plurality of monitoring positions are associated.

In the second manner, the communication apparatus 1300 includes:

a communication module 1302, configured to obtain first configuration information, where the first configuration information is used to configure a plurality of monitoring positions and receive spatial filtering parameter indication information associated with each of the plurality of monitoring positions, the plurality of monitoring positions are used to perform detection on control information, and the plurality of monitoring positions are associated with same receive spatial filtering parameter indication information; and a processing module 1301, configured to perform detection on first information through a first monitoring position, and determine, based on a detection result, whether to perform detection on the control information through a second monitoring position, where the plurality of monitoring positions include the first monitoring position, and the second monitoring position is any monitoring position other than the first monitoring position in the plurality of monitoring positions.

In an optional implementation of the second manner, the processing module 1301 is specifically configured to: if the first information is detected through the first monitoring position, perform detection on the control information through the second monitoring position; or if the first information is not detected through the first monitoring position, skip performing detection on the control information through the second monitoring position.

In an optional implementation of the second manner, the first configuration information includes information indicating the first monitoring position.

In an optional implementation of the second manner, the first monitoring position is a predetermined monitoring position in the plurality of monitoring positions.

In an optional implementation of the second manner, the plurality of monitoring positions are associated.

In an optional implementation of the second manner, the first configuration information includes configuration information of a third search space SS, the configuration information of the third SS includes information indicating a plurality of time offsets in a same periodicity, the plurality of time offsets in the same periodicity are associated with a same transmission configuration indicator TCI, and the TCI indicates a receive spatial filtering parameter. Any one of the plurality of monitoring positions is associated with one of the plurality of time offsets in the same periodicity, and monitoring positions corresponding to the plurality of time offsets in the same periodicity are associated.

In an optional implementation of the second manner, the first configuration information includes configuration information of a plurality of fourth search spaces SSs, configuration information of each fourth SS includes a time offset and periodicity information, the first configuration information further includes information indicating association between the plurality of fourth SSs, the plurality of fourth SSs are associated with a same transmission configuration indicator TCI, and the TCI indicates a receive spatial filtering parameter. Any one of the plurality of monitoring positions is associated with one of the plurality of fourth SSs, the plurality of fourth SSs include same periodicity information, and monitoring positions corresponding to the plurality of fourth SSs in a same periodicity are associated.

With reference to a third manner and a fourth manner, the following describes in detail an implementation in which the communication apparatus 1300 is used in the first device (for example, the access network device).

In the third manner, the communication apparatus 1300 includes:

a processing module 1301, configured to determine first configuration information, where the first configuration information is used to configure a plurality of monitoring positions and receive spatial filtering parameter indication information associated with each of the plurality of monitoring positions, the plurality of monitoring positions are used to perform detection on control information, and at least two of the plurality of monitoring positions are associated with different pieces of receive spatial filtering parameter indication information; and a communication module 1302, configured to send the first configuration information.

In an optional implementation of the third manner, the communication module 1302 is further configured to send control information through a first monitoring position, where the control information indicates not to perform detection on the control information through a second monitoring position, the plurality of monitoring positions include the first monitoring position, and the second monitoring position is any monitoring position other than the first monitoring position in the plurality of monitoring positions.

In an optional implementation of the third manner, the communication module 1302 is further configured to send control information through a first monitoring position, where the control information includes first indication information, the first indication information indicates to perform detection on the control information through a second monitoring position or not to perform detection on the control information through a second monitoring position, the plurality of monitoring positions include the first monitoring position, and the second monitoring position is any monitoring position other than the first monitoring position in the plurality of monitoring positions.

In an optional implementation of the third manner, a start time of the second monitoring position is not earlier than the first monitoring position.

In an optional implementation of the third manner, the first monitoring position is any one of the plurality of monitoring positions.

In an optional implementation of the third manner, the plurality of monitoring positions are associated.

In the fourth manner, the communication apparatus 1300 includes:

a processing module 1301, configured to determine first configuration information, where the first configuration information is used to configure a plurality of monitoring positions and receive spatial filtering parameter indication information associated with each of the plurality of monitoring positions, the plurality of monitoring positions are used to perform detection on control information, and the plurality of monitoring positions are associated with same receive spatial filtering parameter indication information; and a communication module 1302, configured to send the first configuration information.

In an optional implementation of the fourth manner, the communication module 1302 is further configured to send first information through a first monitoring position, where the first information indicates to perform detection on the control information through a second monitoring position, the plurality of monitoring positions include the first monitoring position, and the second monitoring position is any monitoring position other than the first monitoring position in the plurality of monitoring positions.

In an optional implementation of the fourth manner, the first monitoring position is a predetermined monitoring position in the plurality of monitoring positions.

In an optional implementation of the fourth manner, the first configuration information includes information indicating the first monitoring position.

In an optional implementation of the fourth manner, the plurality of monitoring positions are associated.

In an optional implementation of the fourth manner, the first configuration information includes configuration information of a third search space SS, the configuration information of the third SS includes information indicating a plurality of time offsets in a same periodicity, the plurality of time offsets in the same periodicity are associated with a same transmission configuration indicator TCI, and the TCI indicates a receive spatial filtering parameter. Any one of the plurality of monitoring positions is associated with one of the plurality of time offsets in the same periodicity, and monitoring positions corresponding to the plurality of time offsets in the same periodicity are associated.

In an optional implementation of the fourth manner, the first configuration information includes configuration information of a plurality of fourth search spaces SSs, configuration information of each fourth SS includes a time offset and periodicity information, the first configuration information further includes information indicating association between the plurality of fourth SSs, the plurality of fourth SSs are associated with a same transmission configuration indicator TCI, and the TCI indicates a receive spatial filtering parameter. Any one of the plurality of monitoring positions is associated with one of the plurality of fourth SSs, the plurality of fourth SSs include same periodicity information, and monitoring positions corresponding to the plurality of fourth SSs in a same periodicity are associated.

Division into the modules in this embodiment of this application is an example and is merely logical function division, and may be other division in actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

Based on a same technical concept, this application further provides a communication apparatus 1400. The communication apparatus 1400 may be a chip or a chip system. Optionally, in this embodiment of this application, the chip system may include a chip, or may include the chip and another discrete device.

The communication apparatus 1400 may be configured to implement a function of a terminal device (namely, the foregoing second device) or an access network device (namely, the foregoing first device) in the communication system shown in FIG. 1. The communication apparatus 1400 may include at least one processor 1410. The processor 1410 is coupled to a memory. Optionally, the memory may be located in the apparatus, and the memory may be integrated with the processor. Alternatively, the memory may be located outside the apparatus. For example, the communication apparatus 1400 may further include at least one memory 1420. The memory 1420 stores a computer program, configuration information, a computer program or instructions, and/or data that are necessary for implementing any one of the foregoing embodiments. The processor 1410 may execute the computer program stored in the memory 1420, to complete the method in any one of the foregoing embodiments.

The communication apparatus 1400 may further include a communication interface 1430, and the communication apparatus 1400 may exchange information with another device through the communication interface 1430. For example, the communication interface 1430 may be a transceiver, a circuit, a bus, a module, a pin, or a communication interface of another type. When the communication apparatus 1400 is a chip-type apparatus or circuit, the communication interface 1430 in the apparatus 1400 may also be an input/output circuit, and may input information (or referred to as receiving information) and output information (or referred to as sending information). The processor is an integrated processor, a microprocessor, an integrated circuit, or a logic circuit. The processor may determine output information based on input information.

The coupling in this embodiment of this application is indirect coupling or a communication connection between apparatuses, units, or modules for information exchange between the apparatuses, the units, or the modules, and may be in an electrical form, a mechanical form, or another form. The processor 1410 may operate collaboratively with the memory 1420 and the communication interface 1430. A specific connection medium between the processor 1410, the memory 1420, and the communication interface 1430 is not limited in this embodiment of this application.

Figure 14:
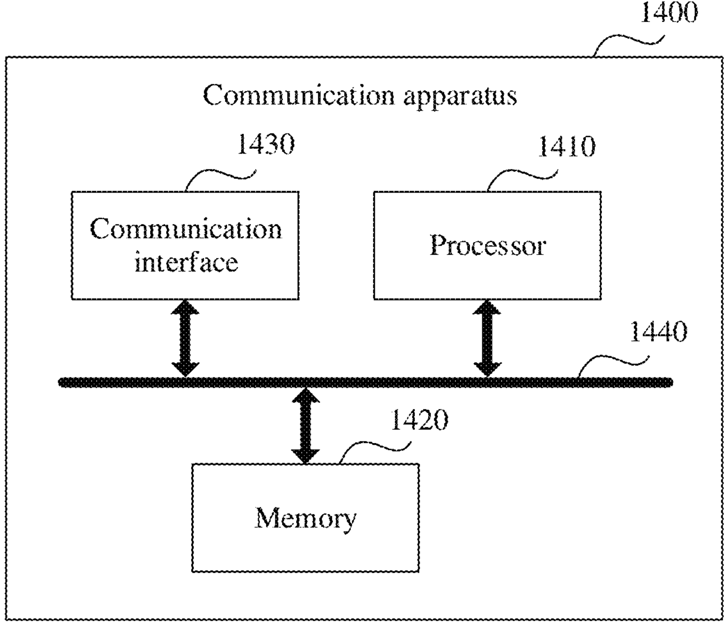
FIG. 14 is a schematic diagram of a structure of another communication apparatus according to an embodiment of this application.

Optionally, as shown in FIG. 14, the processor 1410, the memory 1420, and the communication interface 1430 are connected to each other through a bus 1440. The bus 1440 may be a peripheral component interconnect (PCI) bus, an extended industry standard architecture (EISA) bus, or the like. The bus may be categorized as an address bus, a data bus, a control bus, or the like. For ease of representation, only one thick line is used to represent the bus in FIG. 14, but this does not mean that there is only one bus or only one type of bus.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general purpose processor may be a microprocessor or any conventional processor or the like. The steps of the methods disclosed with reference to embodiments of this application may be directly implemented by a hardware processor, or may be implemented by using a combination of hardware in a processor and a software module.

In embodiments of this application, the memory may be a non-volatile memory, for example, a hard disk drive (HDD) or a solid-state drive (SSD), or may be a volatile memory, for example, a random access memory (RAM). The memory is any other medium that can be configured to carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or data.

In a possible implementation, the communication apparatus 1400 may be used in a terminal device (namely, the foregoing second device). Specifically, the communication apparatus 1400 may be a terminal device, or may be an apparatus that can support a terminal device in implementing a function of the terminal device in any one of the foregoing embodiments. The memory 1420 stores a computer program, instructions, and/or data that are necessary for implementing a function of the terminal device in any one of the foregoing embodiments. The processor 1410 may execute the computer program stored in the memory 1420, to complete the method performed by the terminal device in any one of the foregoing embodiments. The communication interface in the communication apparatus 1400 is used in the terminal device, and may be configured to interact with an access network device, to be specific, send an uplink signal to the access network device or receive a downlink signal from the access network device.

In another possible implementation, the communication apparatus 1400 may be used in an access network device (namely, the foregoing first device). Specifically, the communication apparatus 1400 may be an access network device, or may be an apparatus that can support an access network device in implementing a function of the access network device in any one of the foregoing embodiments. The memory 1420 stores a computer program, instructions, and/or data that are necessary for implementing a function of the access network device in any one of the foregoing embodiments. The processor 1410 may execute the computer program stored in the memory 1420, to complete the method performed by the access network device in any one of the foregoing embodiments. The communication interface in the communication apparatus 1400 is used in the access network device, and may be configured to interact with a terminal device, to be specific, send a downlink signal to the terminal device or receive an uplink signal from the terminal device.

The communication apparatus 1400 provided in this embodiment may be used in a terminal device to complete the method performed by the terminal device, or may be applied to an access network device to complete the method performed by the access network device. Therefore, for technical effects that can be achieved by the apparatus, refer to the foregoing method embodiments. Details are not described herein again.

Based on the foregoing embodiments, an embodiment of this application further provides a computer program. When the computer program is run on a computer, the computer is enabled to perform, from a perspective of a terminal device side or an access network device side, the methods provided in embodiments shown in FIG. 3 to FIG. 12.

Based on the foregoing embodiments, an embodiment of this application further provides a computer-readable storage medium. The computer-readable storage medium stores a computer program. When the computer program is executed by a computer, the computer is enabled to perform, from a perspective of a terminal device side or an access network device side, the methods provided in embodiments shown in FIG. 3 to FIG. 12. The storage medium may be any available medium that can be accessed by the computer. For example, the computer-readable medium may be but is not limited to a RAM, a read-only memory (ROM), an electrically erasable programmable read-only memory (EEPROM), a CD-ROM or another optical disc storage, a magnetic disk storage medium, or another magnetic storage device, or any other medium that can be used to carry or store expected program code in a form of an instruction or a data structure and can be accessed by a computer.

Based on the foregoing embodiments, an embodiment of this application provides a communication system, including a terminal device and an access network device. The terminal device and the access network device may implement the methods provided in embodiments shown in FIG. 3 to FIG. 12.

Based on the foregoing embodiments, an embodiment of this application further provides a chip. The chip is configured to read a computer program stored in a memory, and implement, from a perspective of a terminal device side or an access network device side, the methods provided in embodiments shown in FIG. 3 to FIG. 12.

Based on the foregoing embodiments, an embodiment of this application provides a chip system. The chip system includes a processor, configured to support a computer apparatus in implementing functions related to the terminal device or the access network device in embodiments shown in FIG. 3 to FIG. 12. In a possible design, the chip system further includes a memory. The memory is configured to store a program and data that are necessary for the computer apparatus. The chip system may include a chip, or may include the chip and another discrete device.

All or some of the technical solutions provided in embodiments of this application may be implemented by using software, hardware, firmware, or any combination thereof. When the solutions are implemented by using software, all or some of the solutions may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, an access network device, a terminal device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium, or the like.

In embodiments of this application, when there is no logical conflict, embodiments may be mutually referenced. For example, methods and/or terms in the method embodiments may be mutually referenced, and functions and/or terms in the apparatus embodiments may be mutually referenced. For example, functions and/or terms between the apparatus embodiment and the method embodiment may be mutually referenced.

It is clear that, a person skilled in the art can make various modifications and variations to this application without departing from the scope of this application. This application is intended to cover these modifications and variations of this application provided that they fall within the scope of protection defined by the claims of this application and their equivalent technologies.

In addition, based on a same concept, an embodiment of this application further provides a method for configuring a monitoring position. The method includes:

obtaining first configuration information, where the first configuration information is used to configure a plurality of monitoring positions, and the plurality of monitoring positions are associated; and performing detection on control information through a first monitoring position, where the plurality of monitoring positions include the first monitoring position.

In an optional implementation, the first configuration information includes second configuration information and third configuration information. The second configuration information is used to configure frequency domain positions of the plurality of monitoring positions. The third configuration information is used to configure time domain positions of the plurality of monitoring positions.

In an optional implementation, the second configuration information includes configuration information of a first control resource set CORESET, the configuration information of the first CORESET includes at least two transmission configuration indicators TCIs, and each of the TCIs indicates a receive spatial filtering parameter.

In an optional implementation, the third configuration information includes configuration information of a first search space SS, the first SS is associated with the first CORESET, the configuration information of the first SS includes information indicating a plurality of time offsets in a same periodicity, any one of the plurality of time offsets in the same periodicity is associated with one of the at least two TCIs, and any one of the plurality of monitoring positions is associated with one of the plurality of time offsets in the same periodicity.

In an optional implementation, the plurality of monitoring positions are in a one-to-one correspondence with the plurality of time offsets in the same periodicity, and monitoring positions corresponding to the plurality of time offsets in the same periodicity are associated.

In an optional implementation, the third configuration information includes configuration information of a plurality of second search space SSs, the plurality of second SSs are associated with the first CORESET, any one of the plurality of second SSs is associated with one of the at least two TCIs, and any one of the plurality of monitoring positions is associated with one of the plurality of second SSs.

In an optional implementation, the second configuration information includes configuration information of a plurality of second control resource sets CORESETs, configuration information of each second CORESET includes one transmission configuration indicator TCI, and the TCI is used to determine a receive spatial filtering parameter.

In an optional implementation, the third configuration information includes configuration information of a plurality of second search space SSs, any one of the plurality of second SSs is associated with one of the plurality of second CORESETs, and any one of the plurality of monitoring positions is associated with one of the plurality of second SSs.

In an optional implementation, configuration information of each second SS includes a time offset and periodicity information, the first configuration information further includes information indicating association between the plurality of second SSs, the plurality of second SSs include same periodicity information, and monitoring positions corresponding to the plurality of second SSs in a same periodicity are associated.

In an optional implementation, the first configuration information includes configuration information of a third search space SS, the configuration information of the third SS includes information indicating a plurality of time offsets in a same periodicity, the plurality of time offsets in the same periodicity are associated with a same transmission configuration indicator TCI, and the TCI indicates a receive spatial filtering parameter. Any one of the plurality of monitoring positions is associated with one of the plurality of time offsets in the same periodicity, and monitoring positions corresponding to the plurality of time offsets in the same periodicity are associated.

In an optional implementation, the first configuration information includes configuration information of a plurality of fourth search spaces SSs, configuration information of each fourth SS includes a time offset and periodicity information, the first configuration information further includes information indicating association between the plurality of fourth SSs, the plurality of fourth SSs are associated with a same transmission configuration indicator TCI, and the TCI indicates a receive spatial filtering parameter. Any one of the plurality of monitoring positions is associated with one of the plurality of fourth SSs, the plurality of fourth SSs include same periodicity information, and monitoring positions corresponding to the plurality of fourth SSs in a same periodicity are associated.

An embodiment of this application further provides a communication apparatus, configured to implement the foregoing method for configuring a monitoring position and any optional implementation of the foregoing method for configuring a monitoring position.

An embodiment of this application further provides a communication apparatus, including a processor. The processor is coupled to a memory. The processor is configured to implement the foregoing method for configuring a monitoring position and any optional implementation of the foregoing method for configuring a monitoring position.

An embodiment of this application further provides a computer-readable storage medium. The computer-readable storage medium stores instructions. When the instructions are run on a computer, the computer is enabled to perform the foregoing method for configuring a monitoring position and any optional implementation of the foregoing method for configuring a monitoring position.

An embodiment of this application further provides a computer program product, including instructions. When the instructions are run on a computer, the computer is enabled to perform the foregoing method for configuring a monitoring position and any optional implementation of the foregoing method for configuring a monitoring position.

An embodiment of this application further provides a chip. The chip is configured to read a computer program stored in a memory, and perform the foregoing method for configuring a monitoring position and any optional implementation of the foregoing method for configuring a monitoring position.

What is claimed is:

1. An apparatus, comprising:

one or more memories storing computer executable program code;

one or more transceivers; and one or more processors, coupled to the one or more memories and the one or more transceivers, wherein the program code comprises instructions, and when the one or more processors execute the instructions, the instructions enable the apparatus to perform operations comprising:

obtaining first configuration information, wherein the first configuration information is used to configure a plurality of monitoring positions and receive spatial filtering parameter indication information associated with each of the plurality of monitoring positions, the plurality of monitoring positions are used to perform detection on control information, and at least two monitoring positions of the plurality of monitoring positions are associated with different pieces of receive spatial filtering parameter indication information;

performing detection on the control information through a first monitoring position, to obtain a detection result;

determining, based on the detection result, whether to perform detection on the control information through a second monitoring position, wherein the plurality of monitoring positions comprise the first monitoring position, and the second monitoring position is any monitoring position other than the first monitoring position in the plurality of monitoring positions, and determining, based on the detection result, whether to perform detection on the control information through a second monitoring position comprises:

in response to the detection result being that the control information is detected through the first monitoring position, skipping performing detection on the control information through the second monitoring position; and in response to the detection result being that the control information is not detected through the first monitoring position, performing detection on the control information through the second monitoring position.

2. The apparatus according to claim 1, wherein a start time of the second monitoring position is not earlier than a start time of the first monitoring position.

3. The apparatus according to claim 1, wherein the first monitoring position is any monitoring position of the plurality of monitoring positions.

4. The apparatus according to claim 1, wherein the monitoring positions of the plurality of monitoring positions are associated.

5. The apparatus according to claim 1, wherein the first configuration information comprises second configuration information and third configuration information, the second configuration information is used to configure frequency domain positions of the plurality of monitoring positions, and the third configuration information is used to configure time domain positions of the plurality of monitoring positions.

6. The apparatus according to claim 5, wherein the second configuration information comprises configuration information of a first control resource set (CORESET), the configuration information of the first CORESET comprises at least two transmission configuration indicators (TCIs), and each TCI of the at least two TCIs indicates a receive spatial filtering parameter.

7. The apparatus according to claim 6, wherein the third configuration information comprises configuration information of a first search space (SS), the first SS is associated with the first CORESET, the configuration information of the first SS comprises information indicating a plurality of time offsets in a same periodicity, any time offset of the plurality of time offsets in the same periodicity is associated with one TCI of the at least two TCIs, and any monitoring position of the plurality of monitoring positions is associated with one time offset of the plurality of time offsets in the same periodicity.

8. A apparatus, comprising:

one or more memories storing computer executable program code;

one or more transceivers; and one or more processors, coupled to the one or more memories and the one or more transceivers, wherein the program code comprises instructions, and when the one or more processors executes the instructions, the instructions enable the apparatus to perform operations comprising:

determining first configuration information, wherein the first configuration information is used to configure a plurality of monitoring positions and receive spatial filtering parameter indication information associated with each of the plurality of monitoring positions, the plurality of monitoring positions are used to perform detection on control information, and at least two monitoring positions of the plurality of monitoring positions are associated with different pieces of receive spatial filtering parameter indication information; and sending the first configuration information;

wherein the first configuration information comprises second configuration information and third configuration information, the second configuration information is used to configure frequency domain positions of the plurality of monitoring positions, and the third configuration information is used to configure time domain positions of the plurality of monitoring positions; and wherein the second configuration information comprises configuration information of a first control resource set (CORESET), the configuration information of the first CORESET comprises at least two transmission configuration indicators (TCIs), and each TCI of the at least two TCIs indicates a receive spatial filtering parameter.

9. The apparatus according to claim 8, wherein the operations further comprise:

sending control information through a first monitoring position, wherein the control information indicates not to perform detection on the control information through a second monitoring position, the plurality of monitoring positions comprise the first monitoring position, and the second monitoring position is any monitoring position other than the first monitoring position in the plurality of monitoring positions.

10. The apparatus according to claim 8, wherein the operations further comprise:

sending control information through a first monitoring position, wherein the control information comprises first indication information, the first indication information indicates to perform detection on the control information through a second monitoring position or indicates not to perform detection on the control information through a second monitoring position, the plurality of monitoring positions comprise the first monitoring position, and the second monitoring position is any monitoring position other than the first monitoring position in the plurality of monitoring positions.

11. The apparatus according to claim 9, wherein a start time of the second monitoring position is not earlier than a start time of the first monitoring position.

12. The apparatus according to claim 9, wherein the first monitoring position is any monitoring position of the plurality of monitoring positions.

13. The apparatus according to claim 8, wherein the monitoring positions of the plurality of monitoring positions are associated.

14. The apparatus according to claim 8, wherein the third configuration information comprises configuration information of a first search space (SS), the first SS is associated with the first CORESET, the configuration information of the first SS comprises information indicating a plurality of time offsets in a same periodicity, any time offset of the plurality of time offsets in the same periodicity is associated with one TCI of the at least two TCIs, and any monitoring position of the plurality of monitoring positions is associated with one time offset of the plurality of time offsets in the same periodicity.

15. A non-transitory computer-readable storage medium, wherein the computer-readable storage medium stores instructions, and when the instructions are run on a computer, the computer is enabled to perform:

obtaining first configuration information, wherein the first configuration information is used to configure a plurality of monitoring positions and receive spatial filtering parameter indication information associated with each of the plurality of monitoring positions, the plurality of monitoring positions are used to perform detection on control information, and at least two of the plurality of monitoring positions are associated with different pieces of receive spatial filtering parameter indication information; and performing detection on the control information through a first monitoring position, to obtain a detection result, and determining, based on the detection result, whether to perform detection on the control information through a second monitoring position, wherein the plurality of monitoring positions comprise the first monitoring position, and the second monitoring position is any monitoring position other than the first monitoring position in the plurality of monitoring positions;

wherein the first configuration information comprises second configuration information and third configuration information, the second configuration information is used to configure frequency domain positions of the plurality of monitoring positions, and the third configuration information is used to configure time domain positions of the plurality of monitoring positions;

wherein the second configuration information comprises configuration information of a first control resource set (CORESET), the configuration information of the first CORESET comprises at least two transmission configuration indicators (TCIs), and each TCI of the at least two TCIs indicates a receive spatial filtering parameter; and wherein the third configuration information comprises configuration information of a first search space (SS), the first SS is associated with the first CORESET, the configuration information of the first SS comprises information indicating a plurality of time offsets in a same periodicity, any time offset of the plurality of time offsets in the same periodicity is associated with one TCI of the at least two TCIs, and any monitoring position of the plurality of monitoring positions is associated with one time offset of the plurality of time offsets in the same periodicity.

16. The non-transitory computer-readable storage medium according to claim 15, wherein a start time of the second monitoring position is not earlier than a start time of the first monitoring position.

17. The non-transitory computer-readable storage medium according to claim 15, wherein the first monitoring position is any monitoring position of the plurality of monitoring positions.

18. The non-transitory computer-readable storage medium according to claim 15, wherein the monitoring positions of the plurality of monitoring positions are associated.

19. The non-transitory computer-readable storage medium according to claim 15, wherein determining, based on the detection result, whether to perform detection on the control information through a second monitoring position comprises:

in response to the detection result being that the control information is detected through the first monitoring position, skipping performing detection on the control information through the second monitoring position; and in response to the detection result being that the control information is not detected through the first monitoring position, performing detection on the control information through the second monitoring position.

20. The apparatus according to claim 1, wherein the apparatus is a terminal device.

* * * * *